United States Patent
Zhang

(10) Patent No.: US 10,568,051 B2
(45) Date of Patent: Feb. 18, 2020

(54) METHOD AND DEVICE IN USER EQUIPMENT AND BASE STATION FOR LOW LATENCY COMMUNICATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/261,565

(22) Filed: Jan. 30, 2019

(65) Prior Publication Data
US 2019/0159144 A1    May 23, 2019

Related U.S. Application Data

(63) Continuation of application No. PCT/CN2017/094635, filed on Jul. 27, 2017.

(30) Foreign Application Priority Data

Aug. 2, 2016   (CN) .......................... 2016 1 0620958

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/325* (2013.01);
(Continued)

(58) Field of Classification Search
None
See application file for complete search history.

(56) References Cited

U.S. PATENT DOCUMENTS

| 9,578,606 | B2* | 2/2017 | Seo | ..................... H04W 52/281 |
| 2005/0111391 | A1* | 5/2005 | Oki | ..................... H04W 52/281 |
| | | | | 370/311 |

(Continued)

FOREIGN PATENT DOCUMENTS

| CN | 103889041 A | 6/2014 |
| WO | 2011/120716 A1 | 10/2011 |

OTHER PUBLICATIONS

PCT International Search Report and Written Opinion issued in corresponding application No. PCT/CN2017/094635, dated Oct. 18, 2017.

*Primary Examiner* — Lana N Le
(74) *Attorney, Agent, or Firm* — Maschoff Brennan

(57) ABSTRACT

The present disclosure provides a method and a device in a User Equipment (UE) and a base station used for low latency communication. The UE determines a first power, and transmits a first radio signal with a first power on a first carrier; and determines R power value(s), and transmits R low latency radio signal(s) with the R power(s) respectively on a second carrier. When there exists a value of the first power and the R power value(s) equal to 0, transmission of a corresponding radio signal is dropped. The present disclosure can ensure low latency radio signal transmission power by designing the first reserved power, which in turn improves overall performance of the system.

12 Claims, 7 Drawing Sheets

(51) Int. Cl.
*H04W 52/32* (2009.01)
*H04W 72/04* (2009.01)

(52) U.S. Cl.
CPC ... *H04W 72/0413* (2013.01); *H04W 72/0446* (2013.01); *H04W 72/0473* (2013.01)

(56) References Cited

U.S. PATENT DOCUMENTS

| | | | |
|---|---|---|---|
| 2008/0161033 A1* | 7/2008 | Borran | H04W 52/16 455/522 |
| 2012/0176998 A1* | 7/2012 | Muellner | H04W 52/146 370/329 |
| 2016/0353392 A1* | 12/2016 | Seo | H04W 52/346 |
| 2016/0360550 A1* | 12/2016 | Chen | H04L 5/0096 |
| 2018/0124711 A1* | 5/2018 | Hosseini | H04W 52/146 |
| 2018/0227912 A1* | 8/2018 | Chen | H04L 5/001 |
| 2018/0242264 A1* | 8/2018 | Pelletier | H04W 52/146 |
| 2018/0242317 A1* | 8/2018 | Marinier | H04W 72/042 |
| 2019/0007910 A1* | 1/2019 | Akula | H04W 52/365 |
| 2019/0075524 A1* | 3/2019 | Zhou | H04B 7/0617 |
| 2019/0239216 A1* | 8/2019 | Kundu | H04B 7/0632 |

* cited by examiner

METHOD AND DEVICE IN USER EQUIPMENT AND BASE STATION FOR LOW LATENCY COMMUNICATION

CROSS REFERENCE TO RELATED APPLICATION

This application is a continuation of International Application No. PCT/CN2017/094635, filed Jul. 27, 2017, claiming the priority benefit of Chinese Patent Application Serial Number 201610620958.X, filed on Aug. 2, 2016, the full disclosure of which is incorporated herein by reference.

BACKGROUND

Technical Field

The present disclosure relates to transmission schemes of radio signals in wireless communication systems, and in particular to a method and a device for a User Equipment (UE) and a base station that support low latency communication.

Related Art

In existing Long-term Evolution (LTE) and Long-term Evolution Advanced (LTE-A) systems, a Transmission Time Interval (TTI) or a subframe or a Physical Resource Block (PRB) Pair corresponds to a milli-second (ms) in time. A LTE subframe comprises two time slots, namely, a first time slot and a second time slot, and the first time slot and the second time slot occupy the first half and the second half of a millisecond corresponding to a LTE subframe respectively.

A traditional LTE system, when introducing Carrier Aggregation (CA) mechanism, defines strategies related to power scaling in order to ensure the uplink control information (UCI) is received by a base station. A concrete manner is when transmissions are performed on multiple carriers at the same time, a carrier on which Physical Uplink Control Channel (PUCCH) is transmitted is prior to a carrier on which Physical Uplink Shared Channel (PUSCH) is transmitted in terms of power allocation; and a carrier on which PUSCH that contains UCI is transmitted is prior to a carrier on which PUSCH that does not contain UCI is transmitted in terms of power allocation.

For Release 14 reduced latency and New Radio access technologies (NR) of the 3rd Generation Partner Project (3GPP), an important application scenario is Ultra-Reliable and Low Latency Communications (URLLC). A new type of time interval for reduced latency and URLLC, namely, Short Transmission Time Interval (sTTI) is introduced, corresponding traditional methods of power allocation and power scaling need to be redesigned.

SUMMARY

As found by researchers, when sTTIs of different lengths of duration time are used for uplink transmission on multiple carriers, data transmission in a longer sTTI probably corresponds to data transmission in multiple shorter sTTIs, and among data transmission in the shorter sTTIs, some are uplink control channels, some are data channels which comprise uplink control information, and the remaining ones are pure uplink data channels, and this kind of channel combination may change dynamically. Therefore, a traditional method of power scaling, or the choice of transmitting power of the longer sTTIs becomes a problem.

A direct way is to make multiple carriers equally share a greatest transmitting power that a UE can support. But there is an apparent disadvantage of reducing transmitting power of uplink control channels, which will in turn impact the performance of uplink control channels.

In view of the above problems, the present disclosure provides a solution. It should be noted that the embodiments of the present disclosure and the characteristics in the embodiments may be mutually combined if there is no conflict. For example, the embodiments of the UE of the present disclosure and the characteristics in the embodiments may be applied to the base station, and vice versa.

The present disclosure provides a method in a UE for low latency communication, comprising:

determining a first power, transmitting a first radio signal with a first power on a first carrier;

determining R power value(s), transmitting R low latency radio signal(s) with the R power value(s) respectively on a second carrier;

wherein for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radios signal(s); the first radio signal carries either a first bit block or a first UCI or both of them; the first radio signal comprises L sub-radio signals, the L sub-radio signals occupy L time intervals respectively, the L is a positive integer greater than 1; time domain resources occupied by the R low latency radio signal(s) belong to R time interval(s), the R time interval(s) is(are) R of the L time intervals, the R is a positive integer; the low latency radio signal carries either a low latency bit block or a low latency UCI or both; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one embodiment, power scaling of traditional LTE and LTE-A systems is based on each subframe, and a UE only transmits a type of physical channel in a subframe on one of different carriers. When a UE supports both sTTIs and CA, and the configuration of sTTI on each carrier differs from one another, a UE may transmit different uplink channels in different sTTIs of a subframe, and a longer sTTI on a carrier will correspond to multiple shorter sTTIs with different physical channels on another carrier. Traditional methods of power allocation and power scaling won't be applicable.

In one embodiment, the above method designed in the present disclosure is characterized in that: in a target time interval set, a PUCCH or sPUCCH is more likely to appear in multiple low latency radio signals than in a first radio signal, therefore the low latency radio signal is configured with a first reserved power to ensure a transmitting power of a low latency radio signal. Moreover, according to information carried by the first radio signal and the R low latency radio signal(s) and time domain relationship of occupied time intervals, the present disclosure determines the first power and the R power value(s), and as the UE supports both low latency communication and CA, transmitting powers on different carriers are rationally configured to ensure the receiving performance of uplink channels, especially uplink channels that carry control information, thus improving the performance of the whole system.

In one embodiment, the target time interval set in the above method is used for determining observation windows of the first power and the R power value(s).

In one embodiment, the first interval set in the above method is a time interval in which the second power takes effect.

In one embodiment, transmitting a given radio signal with a given power refers to: if the given power is greater than 0, the given radio signal is transmitted, a transmitting power of the given radio signal is the given power; if the given power is equal to 0, the transmission of the given radio signal is dropped.

In one embodiment, the first power is greater than 0, transmitting a first radio signal with a first power on a first carrier refers to: transmitting the first radio signal, a transmitting power of the first radio signal is the first power.

In one embodiment, the first power is equal to 0, transmitting a first radio signal with a first power on a first carrier refers to: dropping transmission of a first radio signal on a first carrier.

In one embodiment, the R power value(s) is(are) greater than 0, transmitting R low latency radio signal(s) with the R power value(s) respectively on a second carrier refers to: transmitting R low latency radio signal(s) with the R power value(s) respectively on a second carrier.

In one embodiment, the R power value(s) is(are) equal to 0, transmitting R low latency radio signal(s) with the R power value(s) respectively on a second carrier refers to: dropping transmission of R low latency radio signal(s) on a second carrier.

In one embodiment, R1 of the R power value(s) is(are) greater than 0, R2 of the R power value(s) is(are) equal to 0, the phrase transmitting R low latency radio signals with the R power values respectively on a second carrier refers to: dropping the transmission of R2 low latency radio signal(s) on a second carrier, transmitting R1 low latency radio signal(s) on a second carrier, transmitting power(s) of the R1 low latency radio signal(s) is(are) the R1 power value(s) respectively, the R is equal to a sum of the R1 and the R2, the R1 low latency radio signal(s) and the R2 low latency radio signal(s) make up the R low latency radio signals. The R1 and the R2 are both positive integers less than the R.

In one embodiment, a given ideal power is less than or equal to a first reserved power, the given power is equal to the given ideal power. Herein the given power is one of the R power value(s). The given ideal power is a transmitting power of a given low latency radio signal without power scaling. The given low latency radio signal is a low latency radio signal corresponding to the given power in the R low latency radio signal(s).

In one subembodiment, the above embodiment is advantageous in that: the given ideal power represents a power computed by the UE via higher-layer signaling and Transmission Power Control (TPC). When the given ideal power is less than or equal to the first reserved power, the UE does not need a greater transmitting power, and then the given power is equal to the given ideal power, namely, a transmitting power of the given low latency signal is chosen as the given ideal power.

In one embodiment, a given ideal power is greater than a first reserved power, the given power is greater than or equal to the first reserved power. Herein the given power is one of the R power value(s). The given ideal power is a transmitting power of a given low latency radio signal without power scaling. The given low latency radio signal is a low latency radio signal corresponding to the given power in the R low latency radio signal(s).

In one subembodiment, the above embodiment is advantageous in that: the given ideal power represents a power computed by the UE via higher-layer signaling and TPC. When the given ideal power is greater than or equal to the first reserved power, which means that the UE needs a greater transmitting power, then the given power is configured as greater than or equal to the first reserved power, to ensure the given low latency radio signal is transmitted with at least the first reserved power so that the performance of the given low latency radio signal is guaranteed.

In one embodiment, the L time intervals are consecutive.

In one embodiment, the L time intervals are located within a subframe.

In one embodiment, the L time intervals are located within 1 ms.

In one embodiment, the L time intervals are located within 0.5 ms.

In one embodiment, at least two time intervals of the L time intervals are different in duration time.

In one embodiment, the L time intervals are the same in duration time.

In one embodiment, the L1 is equal to the L.

In one embodiment, the L1 is less than the L, the L1 time interval(s) is(are) L1 of the L time intervals.

In one embodiment, the L1 is configurable.

In one embodiment, the L1 is determined by default.

In one embodiment, the L1 is determined by the UE itself.

In one embodiment, at least two time intervals of the L1 time intervals are different in duration time.

In one embodiment, the L1 time intervals are the same in duration time.

In one embodiment, the R time intervals are consecutive in time domain.

In one embodiment, at least two time intervals of the R time intervals are different in duration time.

In one embodiment, the R time intervals are the same in duration time.

In one embodiment, the time intervals occupy a number of multicarrier symbols in time domain, the number is a positive integer equal to one of 1, 2, 4 and 7.

In one embodiment, time domain resources occupied by the R low latency radio signal(s) are configured by a downlink signaling.

In one embodiment, a physical layer channel occupied by the first UCI is a physical layer control channel other than PUCCH Format 1, and a physical layer channel occupied by the first UCI is a physical layer control channel other than PUCCH Format 1a, and a physical layer channel occupied by the first UCI is a physical layer control channel other than PUCCH Format 1b and a physical layer channel occupied by the first UCI is a physical layer control channel other than PUCCH Format 2.

In one embodiment, Resource Unit (RU) specified in the present disclosure refers to the minimal unit of resources allocation. The RU occupies a multicarrier symbol in time domain and a sub-carrier in frequency domain.

In one embodiment, the RU specified in the present disclosure is a Resource Element (RE) of LTE.

In one embodiment, the multicarrier symbol specified in the present disclosure is an Orthogonal Frequency Division Multiplexing (OFDM) symbol that comprises Cyclic Prefix (CP), or the multicarrier symbol specified in the present disclosure is a Discrete Fourier Transform Spreading OFDM (DFT-OFDM) symbol that comprises CP, or the multicarrier symbol specified in the present disclosure is a Single-Carrier Frequency Division Multiple Access (SC-FDMA) symbol, or the multicarrier symbol specified in the present disclosure is a Filter Bank Multi Carrier (FBMC) symbol.

In one embodiment, the multicarrier symbol specified in the present disclosure is an uplink SC-FDMA symbol of LTE.

In one embodiment, a given radio signal carrying a given bit block refers to: the given radio signal is obtained after the given bit block experiences channel coding, modulation mapper, layer mapper, precoding, resource element mapper and generation of OFDM signals.

In one embodiment, a given radio signal carrying a given bit block refers to:

the given bit block is used for generating the given radio signal.

In one embodiment, the first bit block is a Transport Block (TB).

In one embodiment, the first bit block comprises two TBs.

In one embodiment, the first UCI comprises at least one of Hybrid Automatic Repeat request Acknowledgement (HARQ-ACK), Channel State Information (CSI) and Scheduling Request (SR).

In one embodiment, the HARQ-ACK indicates whether related TB is correctly decoded.

In one embodiment, the first bit block and the first UCI are both transmitted on a first physical layer data channel.

In one embodiment, the first bit block is transmitted on a first physical layer data channel, the first UCI is transmitted on a first physical layer control channel.

In one subembodiment of the above two embodiments, the first physical layer data channel is PUSCH, the first physical layer control channel is PUCCH.

In one subembodiment of the above two embodiments, the first physical layer data channel is Short TTI PUSCH (sPUSCH), the first physical layer control channel is Short TTI PUCCH (sPUCCH).

In one subembodiment of the above two embodiments, the length of sTTI corresponding to the first physical layer data channel is 0.5 ms.

In one subembodiment of the above two embodiments, the first UCI is HARQ-ACK, the length of sTTI corresponding to the first UCI is 0.5 ms.

In one embodiment, the low latency UCI comprises at least one of HARQ-ACK, CSI and SR.

In one embodiment, the low latency UCI is HARQ-ACK.

In one embodiment, the low latency bit block is a TB.

In one embodiment, the low latency bit block comprises two TBs.

In one embodiment, for a given low latency radio signal, the low latency bit block and the low latency UCI are both transmitted on a first physical layer data channel.

In one embodiment, for a given low latency radio signal, the low latency bit block is transmitted on a second physical layer data channel, the low latency UCI is transmitted on a second physical layer control channel.

In one subembodiment of the above two embodiments, the second physical layer data channel is sPUSCH, the second physical layer control channel is sPUCCH.

In one subembodiment of the above two embodiments, the length of sTTI corresponding to the second physical layer data channel is less than or equal to 0.5 ms.

In one subembodiment of the above two embodiments, the length of sTTI corresponding to the second physical layer control channel is less than or equal to 0.5 ms.

In one embodiment, the first power and the second power are linear values respectively.

In one embodiment, the first power and the second power are measured in watts (W) respectively.

In one embodiment, the first power and the second power are measured in milliwatts (MW) respectively.

In one embodiment, the first power and the second power are measured in dBm respectively.

In one embodiment, the process A and the process B are performed at the same time.

In one embodiment, the start time of the process A is previous to that of the process B.

In one embodiment, the duration time of the process A overlaps that of the process B in time domain.

In one embodiment, the first reserved power is invariant.

In one subembodiment, the first reserved power being invariant refers to: the proportion of the first reserved power to a greatest uplink transmitting power that the UE can support is invariant.

According to one aspect of the present disclosure, the above method is characterized in that: at least a first time interval of the R time intervals belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted on a physical layer data channel, the low latency UCI is transmitted on a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; a second ideal power is less than or equal to a third power, the second power is equal to the second ideal power; or a second power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval.

In one embodiment, the above method is characterized in that the priority of the first radio signal is lower than that of the given low latency radio signal, a transmitting power is preferentially allocated to the low latency radio signal to ensure the receiving performance of the low latency radio signal.

In one embodiment, the third power and the fourth power are linear values respectively.

In one embodiment, the third power and the fourth power are measured in watts (W) respectively.

In one embodiment, the third power and the fourth power are measured in milliwatts (MW) respectivey.

In one embodiment, a physical layer channel corresponding to the first radio signal is a UCI-excluded PUSCH or sPUSCH, and a physical layer channel corresponding to the low latency radio signal is a UCI-included PUSCH or sPUSCH.

In one embodiment, a physical layer channel corresponding to the first radio signal is a UCI-excluded PUSCH or sPUSCH, and a physical layer channel corresponding to the low latency radio signal is a PUCCH or sPUCCH.

In one embodiment, a physical layer channel corresponding to the first radio signal is a UCI-included PUSCH or sPUSCH, and a physical layer channel corresponding to the low latency radio signal is a PUCCH or sPUCCH.

In one embodiment, a given radio signal carrying first information refers to: the given first radio signal is used for generating the given radio signal.

In one subembodiment, target information is further used for generating the given radio signal. Herein the target information is information other than the given first information.

In one embodiment, a given radio signal carrying first information refers to: the given radio signal carries at least the given first information.

In one embodiment, a given radio signal carrying given first information of given first information and given second information refers to: the given radio signal carries the given first information, and the given radio signal does not carry the given second information.

In one embodiment, the UE only transmits a radio signal on the first carrier and the second carrier in the given time interval, the third power is a greatest total transmitting power.

In one embodiment, the first ideal power is invariant.

In one embodiment, a generation type of the first ideal power is predefined.

In one embodiment, the first ideal power is configurable.

In one embodiment, the first ideal power is related to at least one of the given time interval's position in a given subframe and a given subframe's position in a given radio frame. Herein, the given subframe is a subframe occupied by the given time interval, a given radio frame is a radio frame occupied by the given subframe.

In one embodiment, the first ideal power is related to the type of a physical layer channel corresponding to the first radio signal.

In one embodiment, the UE transmits uplink physical layer signaling on M carriers in the first time interval. The M carriers comprise the first carrier and the second carrier, subscripts 3 to M correspond to carrier(s) other than the first carrier and the second carrier of the M carriers. The j represents a position number of the first time interval in a given subframe. The given subframe is a subframe occupied by the first time interval. The M is a positive integer not less than 2.

In one subembodiment, a physical layer channel corresponding to the first low latency radio signal is PUCCH or sPUCCH; the PUCCH employs one of PUCCH Format 1, PUCCH Format 1a, PUCCH Format 1b, PUCCH Format 2, PUCCH Format 2a, PUCCH Format 2b and PUCCH Format 3; or the sPUCCH employs one of PUCCH Format 1, PUCCH Format 1a, PUCCH Format 1b, PUCCH Format 2, PUCCH Format 2a, PUCCH Format 2b and PUCCH Format 3; the second power $P_2(j)$ meets the following formula:

$$P_2(j) = \min \begin{Bmatrix} P_{CMAX,C_2}(j), \\ P_{0\_PUCCH} + PL_{C_2} + h(n_{CQI}, n_{HARQ}, n_{SR}) + \Delta_{F\_PUCCH}(F) + \\ \Delta_{TxD}(F') + g(j) \end{Bmatrix}$$

Herein, the second carrier is indexed by subscript $C_2$, $P_{CMAX,C_2}(j)$ is a power configured for the UE on the second carrier, and is linear with a greatest transmitting power that the UE supports, the $\Delta_{F\_PUCCH}(F)$ and $\Delta_{TxD}(F')$ are configured by higher-layer signaling, $h(n_{CQI}, n_{HARQ}, n_{SR})$ is related to PUCCH Format employed by the first low latency radio signal, $P_{0\_PUCCH}$ is related to configuration of higher-layer signaling, $PL_{C_2}$ corresponds to path loss of the UE on the second carrier, $g(j)$ is related to TPC. The specific meaning can be found in 3GPP Technical Specification (TS) 36.213, chapter 5.1.

In one subembodiment, a physical layer channel corresponding to the first low latency radio signal is PUCCH or sPUCCH; the PUCCH employs PUCCH Format 4 or PUCCH Format 5; or the sPUCCH employs PUCCH Format 4 or PUCCH Format 5; the second power $P_2(j)$ meets the following formula:

$$P_2(j) = \min \begin{Bmatrix} P_{CMAX,C_2}(j), \\ P_{0\_PUCCH} + PL_{C_2} + 10\log_{10}(M_{PUCCH,C_2}(j)) + \Delta_{TF,C_2}(j) + \\ \Delta_{F\_PUCCH}(F) + g(j) \end{Bmatrix}$$

Herein, the second carrier is indexed by subscript $C_2$, $M_{PUCCH,C_2}(j)$ refers to a number of Physical Resource Block (PRB) pairs occupied by the first low latency radio signal in frequency domain, $\Delta_{TF,C_2}(j)$ is related to a number of bits occupied by the first low latency radio signal, the specific meaning can be found in 3GPP Technical Specification (TS) 36.213, chapter 5.1.

In one subembodiment, among the remaining carriers, there exists a UCI-included uplink signal transmitted on each of Y carrier(s), and the first radio signal does not carry UCI; or there exists a PUCCH or a sPUCCH transmitted on each of Y carrier(s), and the first radio signal corresponds to PUCCH or sPUCCH. A sum of transmitting power(s) corresponding to Y carrier(s) is equal to $$\sum_{y \in Y} P_y(j).$$

The Y is less than or equal to (M−2). The first ideal power $P_1^{Ideal}(j)$ meets the following formula:

$$P_1^{Ideal}(j) = \min \begin{Bmatrix} 10\log_{10}(\hat{P}_{CMAX,C_1}(j)), \\ 10\log_{10}(M_{PUSCH,C_1}(j)) + P_{0\_PUSCH,C_1}(j) + \alpha_{C_1}(j) \cdot \\ PL_{C_1} + \Delta_{TF,C_1}(j) + f_{C_1}(j) \end{Bmatrix}$$

Herein, the first carrier is indexed by subscript $C_1$, $M_{PUSCH,C_1}(j)$ is related to a number of PRB pairs occupied by the first radio signal in frequency domain, $P_{0\_PUSCH,C_1}(j)$, $\Delta_{TF,C_1}(j)$ and $\alpha_{C_1}(j)$ are related to configuration of higher-layer signaling, $f_{C_1}(j)$ is related to TPC. The specific meaning can be found in 3GPP Technical Specification (TS) 36.213, chapter 5.1.

In one affiliated embodiment of the above subembodiment, the fourth power is equal to $$\sum_{y \in Y} P_y(j)$$

or a sum of power(s) on the remaining carriers.

In one affiliated embodiment of the above subembodiment, the third power is equal to a difference between $P_{TMAX}$ and a fourth power.

In one affiliated embodiment of the above subembodiment, a first remaining power $P_{RE1}$ is defined, and the $P_{RE1}$ meets:

$$P_{RE1} = P_{TMAX} - P_2(j) - \sum_{y \in Y} P_y(j)$$

Herein, $P_2(j)$ is the second power.

In an example of the affiliated embodiment, the $P_1^{Ideal}(j)$ is less than or equal to $P_{RE1}$, the first power is equal to the $P_1^{Ideal}(j)$.

In an example of the affiliated embodiment, the $P_1^{Ideal}(j)$ is greater than $P_{RE1}$, the first power is equal to a product of the $P_1^{Ideal}(j)$ and a given scaling factor, and meets $w \cdot P_1^{Ideal}(j) \leq P_{RE1}$. Herein, w is a real number not less than 0 and not greater than 1.

In an example of the affiliated embodiment, the first radio signal carries the first bit block between the first bit block and the first UCI, the first low latency radio signal carries the low latency UCI, and the low latency UCI is transmitted on a physical layer data channel; among the remaining carriers, there exists a PUCCH or sPUCCH transmitted on each of Y1 carrier(s), and there exist physical layer channels transmitted on each of Y2 carrier(s) being UCI-included PUSCH or sPUSCH; the Y1 and the Y2 are both integers not less than 0, and a sum of the Y1 and the Y2 is less than or equal to (M−2); a sum of power(s) on the Y1 carrier(s) is equal to $$\sum_{y1 \in Y1} P_{y1}(j),$$

a sum of transmitting power(s) on the Y2 carrier(s) is equal to $$\sum_{y2 \in Y2} P_{y2}(j).$$

The second power $P_2(j)$ meets the following formula:

$$P_2(j) = \min \begin{cases} \max\left\{P_{TMAX} - \sum_{y1 \in Y1} P_{y1}(j), P_{Reserved, C_2}\right\} \\ 10\log_{10}(\hat{P}_{CMAX, C_2}(j)), \\ 10\log_{10}(M_{PUSCH, C_2}(j)) + P_{O\_PUSCH, C_2}(j) + \\ \alpha_{C_2}(j) \cdot PL_{C_2} + \Delta_{TF, C_2}(j) + f_{C_2}(j) \end{cases}$$

Herein, the second carrier is indexed by subscript $C_2$, $P_{Reserved, C_2}$ represents the first reserved power, $M_{PUSCH,C_2}(j)$ is related to a number of PRB pairs occupied by the first low latency radio signal in frequency domain, $P_{O\_PUSCH,C_2}(j)$ and $\alpha_{C_2}(j)$ are related to configuration of higher-layer signaling, $f_{C_2}(j)$ is related to TPC. The specific meaning can be found in 3GPP Technical Specification (TS) 36.213, chapter 5.1.

In one affiliated embodiment of the above subembodiment, the second ideal power is $P_2^{Ideal}(j)$, and $P_2^{Ideal}(j)$ meets the following formula:

$$P_2^{Ideal}(j) = 10\log_{10}(M_{PUSCH,C_2}(j)) + P_{O\_PUSCH,C_2}(j) + \alpha_{C_2}(j) \cdot PL_{C_2} + \Delta_{TF,C_2}(j) + f_{C_2}(j)$$

In one affiliated embodiment of the above subembodiment, the fourth power is equal to $$\sum_{y \in Y1} P_{y1}(j)$$

or a sum of power(s) on the remaining carriers.

In one affiliated embodiment of the above subembodiment, a second remaining power $P_{RE2}$ is defined, and the $P_{RE2}$ meets:

$$P_{RE2} = P_{TMAX} - P_2(j) - \sum_{y \in Y1} P_{y1}(j) - \sum_{y \in Y2} P_{y2}(j)$$

In one affiliated embodiment of the above subembodiment, the $P_1^{Ideal}(j)$ is described as:

$$P_1^{Ideal}(j) = \min \begin{cases} 10\log_{10}(\hat{P}_{CMAX, C_1}(j)), \\ 10\log_{10}(M_{PUSCH, C_1}(j)) + P_{O\_PUSCH, C_1}(j) + \\ \alpha_{C_1}(j) \cdot PL_{C_1} + \Delta_{TF, C_1}(j) + f_{C_1}(j) \end{cases}$$

In one affiliated embodiment of the above subembodiment, the $P_1^{Ideal}(j)$ is less than or equal to $P_{RE2}$, the first power is equal to the $P_1^{Ideal}(j)$.

In one affiliated embodiment of the above subembodiment, the $P_1^{Ideal}(j)$ is greater than $P_{RE2}$, the first power is equal to a product of the $P_1^{Ideal}(j)$ and the given scaling factor w, and meets $w \cdot P_1^{Ideal}(j) \leq P_{RE2}$.

In one affiliated embodiment of the above subembodiment, the Y1 is equal to 0, and the $$\sum_{y \in Y1} P_{y1}(j)$$

is equal to 0.

In one affiliated embodiment of the above subembodiment, the Y2 is equal to 0, and the $$\sum_{y \in Y2} P_{y2}(j)$$

is equal to 0.

In one embodiment, the first ideal power is greater than a difference between the third power and the second power, the R power value(s) is(are) transmitting power(s) of corresponding low latency radio signal(s) without power scaling.

In one subembodiment, the R low latency radio signal(s) comprises(comprise) at least a given low latency radio signal, the given low latency radio signal carries the low latency bit block between the low latency bit block and the low latency UCI.

In the above subembodiment, the priority of a type of information carried by the given low latency radio signal is equal to or lower than that of information carried by the first radio signal. However as for power allocation, the priority of the given low latency radio signal is higher than that of the first radio signal.

In one embodiment, the above subembodiment is characterized in that though the given low latency radio signal whose priority is lower than that of the first radio signal exists in the R low latency radio signal(s), the priority of the first low latency radio signal in the first time interval is higher than that of the first radio signal, the power scaling will be based on the judgment made in the first time interval.

According to one aspect of the present disclosure, the above method is characterized in that at least a first time interval of the R time interval(s) belongs to the target time interval set; the first radio signal carries the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; a first ideal power is less than or equal to a difference between a third power and a first reserved power, the first power is equal to the first ideal power; or a first ideal power is greater than a difference between a third power and a first reserved power, the first power is less than or equal to a difference between a third power and a first reserved power; the first ideal power is a transmitting power of the first radio signal without power scaling, the second ideal power is a transmitting power of the first low latency radio signal without power scaling, the third power is a difference between a maximum total transmitting power and a fourth power, the fourth power is a total transmitting power of the UE on carriers other than the first carrier and the second carrier in the first time interval.

In one embodiment, the above method is characterized in that the priority of the first radio signal is higher than that of the low latency radio signal, a transmitting power is preferentially allocated to the first radio signal to ensure the receiving performance of the first radio signal, and at the same time the first reserved power is configured to ensure the first low latency radio signal is transmitted.

In one embodiment, a physical layer channel corresponding to the first radio signal is a PUSCH or sPUSCH that carries UCI, and a physical layer channel corresponding to the low latency radio signal is a PUSCH or sPUSCH that does not carry UCI.

In one embodiment, a physical layer channel corresponding to the first radio signal is a PUCCH or sPUCCH, and a physical layer channel corresponding to the low latency radio signal is a PUSCH or sPUSCH that does not carry UCI.

In one embodiment, a physical layer channel corresponding to the first radio signal is a PUSCH or sPUSCH, and a physical layer channel corresponding to the low latency radio signal is a PUSCH or sPUSCH that does not carry UCI.

In one embodiment, the second ideal power is invariant.

In one embodiment, a generation type of the second ideal power is predefined.

In one embodiment, the second ideal power is configurable.

In one embodiment, the second ideal power is related to at least one of the given time interval's position in a given subframe and a given subframe's position in a given radio frame. Herein, the given subframe is a subframe occupied by the given time interval, a given frame radio is a radio frame occupied by the given subframe.

In one embodiment, the second ideal power is related to a type of physical layer channel corresponding to the given low latency radio signal.

In one embodiment, the UE transmits uplink physical layer signaling on M carriers in the first time interval. The M carriers comprise the first carrier and the second carrier, inferior numbers 3 to M correspond to remaining carrier(s) other than the first carrier and the second carrier of the M carriers. The j represents a position number of the first time interval in a given subframe. The given subframe is a subframe occupied by the first time interval. The M is a positive integer not less than 2.

In one subembodiment, a physical layer channel corresponding to the first radio signal is a PUCCH or sPUCCH, the PUCCH employs one of PUCCH Format 1, CCH Format 1a, CCH Format 1b, CCH Format 2, CCH Format 2a, CCH Format 2b and PUCCH Format 3; or sPUCCH employs one of PUCCH Format 1, CCH Format 1a, CH Format 1b, CCH Format 2, CCH Format 2a, CCH Format 2b and PUCCH Format 3; PUCCH or sPUCCH is further transmitted on Z carrier(s) of the remaining carrier(s), the first power $P_1(j)$ meets the following formula:

$$P_1(j) = \min\begin{Bmatrix} P_{CMAX,C_1}(j), \\ P_{TMAX} - \sum_{z \in Z} P_z - P_{Reserved,C_2}, \\ P_{0\_PUCCH} + PL_{C_1} + h(n_{CQI}, n_{HARQ}, n_{SR}) + \\ \Delta_{F\_PUCCH}(F) + \Delta_{T \times D}(F') + g(j) \end{Bmatrix}$$

Herein, the first carrier is indexed by subscript $C_1$, $$\sum_{z \in Z} P_z$$

represents a total transmitting power of the Z carrier(s), $P_{TMAX}$ is a total transmitting power of the UE, $P_{Reserved,C_2}$ is the first reserved power, $P_{CMAX,C_1}(j)$ is a power configured for the UE on the first carrier, and is linear with a greatest transmitting power that the UE supports, the $\Delta_{F\_PUCCH}(F)$ and $\Delta_{TxD}(F')$ are configured by higher-layer signaling, h ($n_{CQI}, n_{HARQ}, n_{SR}$) is related to PUCCH Format employed by the first radio signal, $P_{0\_PUCCH}$ is related to configuration of higher-layer signaling, $PL_{C_1}$ corresponds to path loss of the UE on the first carrier, g(j) is related to Transmission Power Control (TPC). The specific meaning can be found in 3GPP Technical Specification (TS) 36.213, chapter 5.1.

In one subembodiment, a physical layer channel corresponding to the first radio signal is a PUCCH or sPUCCH, and the PUCCH employs PUCCH Format 4 or PUCCH Format 5, or the sPUCCH employs PUCCH Format 4 or PUCCH Format 5; PUCCH or sPUCCH is further transmitted on Z carrier(s) of the remaining carrier(s); the Z is a positive integer not less than 0 and not greater than (M−2); the first power $P_1(j)$ meets the following formula:

$$P_1(j) = \min\begin{Bmatrix} P_{CMAX,C_1}(j), \\ P_{TMAX} - \sum_{z \in Z} P_z - P_{Reserved,C_2}, \\ P_{0\_PUCCH} + PL_{C_1} + 10\log_{10}(M_{PUCCH,C_1}(j)) + \\ \Delta_{TF,C_1}(j) + \Delta_{F\_PUCCH}(F) + g(j) \end{Bmatrix}$$

Herein, the first carrier is indexed by subscript $C_1$, $P_{Reserved,C_2}$ is the first reserved power, $M_{PUCCH,C_1}(j)$ represents a number of PRB pairs occupied by the first radio signal in frequency domain, $\Delta_{TF,C}(j)$ is related to a number of bits occupied by the first radio signal, the specific meaning can be found in 3GPP Technical Specification (TS) 36.213, chapter 5.1.

In one affiliated embodiment of the above two subembodiments, the fourth power is equal to $$\sum_{z \in Z} P_z$$

or a sum of the remaining carrier(s).

In one affiliated embodiment of the above two subembodiments, the third power is equal to a difference between $P_{TMAX}$ (and the fourth power.

In one affiliated embodiment of the above two subembodiments, the Z is equal to 0, and the $$\sum_{z \in Z} P_z$$

is equal to 0.

In one affiliated embodiment of the above two subembodiments, the first ideal power is $P_1^{Ideal}(j)$, and $P_1^{Ideal}(j)$ meets the following formula:

$$P_1^{Ideal}(j) = P_{0\_PUCCH} + PL_{C_1} + 10 \log_{10}(M_{PUCCH,C_1}(j)) + \Delta_{TF,C_1}(j) + \Delta_{F\_PUCCH}(F) + g(j)$$

In one affiliated embodiment of the above subembodiments, among the remaining carrier(s), there exists a UCI-included uplink signal transmitted on each of Y carrier(s), and the UCI-included uplink signal is transmitted on a PUSCH or sPUSCH. A sum of transmitting power(s) on the Y carrier(s) is equal to $$\sum_{y \in Y} P_y(j).$$

The Y is less than or equal to (M−2−Z). The second ideal power $P_2^{Ideal}(j)$ meets the following formula:

$$P_2^{Ideal}(j) = \min \left\{ \begin{array}{l} 10\log_{10}(\hat{P}_{CMAX,C_2}(j)), \\ 10\log_{10}(M_{PUSCH,C_2}(j)) + P_{0\_PUSCH,C_2}(j) + \\ \alpha_{C_2}(j) \cdot PL_{C_2} + \Delta_{TF,C_2}(j) + f_{C_2}(j) \end{array} \right\}$$

Herein, the second carrier is indexed by subscript $C_2$, $M_{PUSCH,C_2}(j)$ is related to a number of PRB pairs occupied by the first low latency radio signal in frequency domain, $P_{O\_PUSCH,C_2}(j)$, $\Delta_{TF,C_2}(j)$ and $\alpha_{C_2}(j)$ are related to configuration of higher-layer signaling, $f_{C_2}(j)$ is related to TPC. The specific meaning can be found in 3GPP Technical Specification (TS) 36.213, chapter 5.1.

In an example of the affiliated embodiment, the first low latency radio signal does not carry UCI, a third remaining power $P_{RE3}$ is defined, and the $P_{RE3}$ meets:

$$P_{RE3} = P_{TMAX} - P_1(j) - \sum_{y \in Y} P_y(j) - \sum_{z \in Z} P_z$$

In an example of the example, the $P_2^{Ideal}(j)$ is less than or equal to $P_{RE3}$, the second power is equal to the $P_2^{Ideal}(j)$.

In an example of the example, the $P_2^{Ideal}(j)$ is greater than $P_{RE3}$, the second power is equal to a product of the $P_2^{Ideal}(j)$ and the scaling factor w, and meets $w \cdot P_2^{Ideal}(j) \leq P_{RE3}$.

In an example of the affiliated embodiment, the first low latency radio signal carries UCI, and the first low latency radio signal is transmitted on a PUSCH or sPUSCH. A fourth power $P_{RE4}$ is defined, and the $P_{RE4}$ meets:

$$P_{RE4} = P_{TMAX} - P_1(j) - \sum_{z \in Z} P_z$$

In an example of the example, the $P_2^{Ideal}(j)$ is less than or equal to $P_{RE4}$, the second power is equal to the $P_2^{Ideal}(j)$.

In an example of the example, the $P_2^{Ideal}(j)$ is greater than $P_{RE4}$, the second power is equal to a product of the $P_2^{Ideal}(j)$ and the scaling factor, and meets $w \cdot P_2^{Ideal}(j) \leq P_{RE4}$.

In one subembodiment, the first low latency radio signal carries the low latency bit block between the low latency bit block and the low latency UCI, the first radio signal carries the first UCI, and the first UCI is transmitted on a physical layer data channel. Among the remaining carrier(s), there exists a PUCCH or sPUCCH transmitted on each of Y1 carrier(s) and a physical layer channel transmitted on each of Y2 carrier(s) being a UCI-included PUSCH or sPUSCH. The Y1 and the Y2 are integers not less than 0, and a sum of the Y1 and Y2 is less than or equal to (M−2). A sum of power(s) on the Y1 carrier(s) is $$\sum_{y1 \in Y1} P_{y1}(j),$$

and a sum of power(s) on the Y2 carrier(s) is $$\sum_{y2 \in Y2} P_{y2}(j).$$

The first power $P_1(j)$ meets the following formula:

$$P_1(j) = \min \left\{ \begin{array}{l} P_{TMAX} - \sum_{y1 \in Y1} P_{y1}(j) - P_{Reserved,C_2} \\ 10\log_{10}(\hat{P}_{CMAX,C_1}(j)), \\ 10\log_{10}(M_{PUSCH,C_1}(j)) + P_{O\_PUSCH,C_1}(j) + \alpha_{C_1}(j) \cdot \\ PL_{C_1} + \Delta_{TF,C_1}(j) + f_{C_1}(j) \end{array} \right\}$$

Herein, the first carrier is indexed by subscript $C_1$, $P_{Reserved,C_2}$ is the first reserved power, $M_{PUSCH,C_1}(j)$ is related to a number of PRB pairs occupied by the first radio signal in frequency domain, $P_{O\_PUSCH,C_1}(j)$ and $\alpha_{C_1}(j)$ are related to configuration of higher-layer signaling, $f_{C_1}(j)$ is related to TPC. The specific meaning can be found in 3GPP Technical Specification (TS) 36.213, chapter 5.1.

In one affiliated embodiment of the above subembodiment, the first ideal power is $P_1^{Ideal}(j)$, and $P_1^{Ideal}(j)$ meets the following formula:

$$P_1^{Ideal}(j) = 10\log_{10}(M_{PUSCH,C_1}(j)) + P_{O\_PUSCH,C_1}(j) + \alpha_{C_1}(j) \cdot PL_{C_1} + \Delta_{TF,C_1}(j) + f_{C_1}(j)$$

In one affiliated embodiment of the above subembodiment, a fifth remaining power is defined, and the $P_{RE5}$ meets:

$$P_{RE5} = P_{TMAX} - P_1(j) - \sum_{y \in Y1} P_{y1}(j) - \sum_{y \in Y2} P_{y2}(j)$$

In one affiliated embodiment of the above subembodiment, the fourth power corresponds to $$\sum_{y \in Y1} P_{y1}(j)$$

or a sum of power(s) on the remaining carrier(s).

In one affiliated embodiment of the above subembodiment, the third power corresponds to a difference between $P_{TMAX}$ and a fourth power.

In one affiliated embodiment of the above subembodiment, the second ideal power $P_2^{Ideal}(j)$ meets the following formula:

$$P_2^{Ideal}(j) = \min \begin{cases} 10\log_{10}(\hat{P}_{CMAX,C_2}(j)), \\ 10\log_{10}(M_{PUSCH,C_2}(j)) + P_{O\_PUSCH,C_2}(j) + \\ \alpha_{C_2}(j) \cdot PL_{C_2} + \Delta_{TF,C_2}(j) + f_{C_2}(j) \end{cases}$$

In an example of the affiliated embodiment, the $P_2^{Ideal}(j)$ is less than or equal to $P_{RE5}$, the second power is equal to the $P_2^{Ideal}(j)$.

In an example of the affiliated embodiment, the $P_2^{Ideal}(j)$ is greater than $P_{RE5}$, the second power is equal to a product of the $P_2^{Ideal}(j)$ and the given scaling factor w, and meets $w \cdot P_2^{Ideal}(j) \leq P_{RE5}$.

In an example of the affiliated embodiment, the Y1 is equal to 0, and the $$\sum_{y \in Y1} P_{y1}(j)$$

is equal to 0.

In an example of the affiliated embodiment, the Y2 is equal to 0, and the $$\sum_{y \in Y2} P_{y2}(j)$$

is equal to 0.

In one embodiment, the R low latency radio signal(s) comprise at least a given low latency radio signal, the given low latency radio signal carries the low latency bit block between the low latency bit block and the low latency UCI, time domain resources occupied by the given low latency radio signal are out of the target time interval set, power allocated to the given low latency radio signal is a given power of the R power(s), the given power is less than a given ideal power, the given ideal power is a transmitting power of the given low latency radio signal without power scaling.

In one subembodiment, the given power is equal to a difference between a third power and a first power.

In the above subembodiment, the priority of a type of information carried by the given low latency radio signal is equal to or higher than that of information carried by the first radio signal. However as for power allocation, the priority of the given low latency radio signal is lower than that of the first radio signal.

In one subembodiment, the above subembodiment is characterized in that: among the R low latency radio signal(s), there exists a given low latency radio signal located out of the target time interval set (i.e. observation window), and the priority of the given low latency radio signal is higher than that of the first radio signal. But the power allocation and power scaling are still performed in accordance with the priority of a first low latency radio signal and the first radio signal observed in the first time interval. When the priority of the first low latency radio signal is lower than that of the first radio signal, the first radio signal still takes precedence in power allocation. Wherein the first low latency radio signal is a low latency radio signal in the first time interval.

According to one aspect of the present disclosure, the above method is characterized in that at least a first time interval of the R time interval(s) belongs to the target time interval set; the first radio signal carries the first bit block between the first bit block and the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel; or the first radio signal carries first UCI, the first low latency radio signal carries the low latency UCI, the first UCI is transmitted on a physical layer data channel, the low latency UCI is transmitted on a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power and a second ideal power is less than or equal to a first reserved power, the second power is equal to a second ideal power, the first power is less than or equal to a difference between the third power and a second ideal power; or a sum of a first ideal power and a second ideal power is greater than a third power and a second ideal power is greater than a first reserved power, the first power is less than or equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are both real numbers not less than 0 and not greater than 1; the third power is a difference between a maximum total transmitting power and a fourth power, the fourth power is a total transmitting power of the UE on carriers other than the first carrier and the second carrier in the first time interval, the fifth power is equal to a difference between the third power and a first reserved power.

In one embodiment, the above method is characterized in that the priority of the first radio signal is equal to that of the low latency radio signal, the first radio signal and the low latency radio signal simultaneously allocate a transmitting power to ensure the receiving performance of both of them.

In one embodiment, a physical layer channel corresponding to the first radio signal is a UCI-excluded PUSCH or sPUSCH, and a physical layer channel corresponding to the low latency radio signal is a UCI-excluded PUSCH or sPUSCH.

In one embodiment, a physical layer channel corresponding to the first radio signal is a UCI-included PUSCH or sPUSCH, and a physical layer channel corresponding to the low latency radio signal is a UCI-included PUSCH or sPUSCH.

In one embodiment, a physical layer channel corresponding to the first radio signal is a PUCCH or sPUCCH, and a physical channel corresponding to the low latency radio signal is a PUCCH or sPUCCH.

In one embodiment, the first radio signal carries the first UCI, and the first scaling factor corresponding to the first ideal power is equal to 1.

In one embodiment, the low latency radio signal carries the low latency UCI, and the second scaling factor corresponding to the second ideal power is equal to 1.

In one embodiment, the first radio signal carries the first bit block between the first bit block and the first UCI, and the first scaling factor corresponding to the first ideal power is less than 1.

In one embodiment, the low latency radio signal carries the low latency bit block between the first bit block and the low latency UCI, and the first scaling factor corresponding to the second ideal power is less than 1.

In one embodiment, the first power is $P_1(j)$, the first ideal power is $P_1^{Ideal}$, the second power is $P_2(j)$, the second ideal power is $P_2^{Ideal}$, the third power is $P_{Remain}(j)$, a sum of $P_1^{Ideal}$ and $P_2^{Ideal}$ is less than or equal to $P_{Remain}(j)$, and $P_1(j)$ and $P_2(j)$ meets the following formula:

$$P_1(j)=P_1^{Ideal}$$

$$P_2(j)=P_2^{Ideal}$$

In one subembodiment, the j represents a position number of the given time interval in a given subframe. The given subframe is a subframe occupied by the given time interval.

In one subembodiment, the $P_{Remain}(j)$ meets the following formula:

$$P_{Remain}(j) = P_{TMAX} - \sum_{C_n \neq C_1, C_n \neq C_2}^{C_M} P_{C_n}(j)$$

Herein, the $P_{TMAX}$ is a greatest uplink transmitting power of the UE, the $P_{C_n}(j)$ is a transmitting power of the carrier $C_n$ in a given time interval. The $$\sum_{C_n \neq C_1, C_n \neq C_2}^{C_M} P_{C_n}(j)$$

corresponds to the fourth power, the carrier $C_1$ corresponds to the first carrier, the carrier $C_2$ corresponds to the second carrier, the carrier set $C_M$ corresponds to all carriers on which uplink transmissions are simultaneously performed by the UE in the time interval. The carrier $C_n$ is a carrier other than the first carrier and the second carrier.

In one affiliated embodiment of the above subembodiment, a PUCCH or sPUCCH is transmitted on the carrier $C_n$ in the given time interval.

In one affiliated embodiment of the above subembodiment, a UCI-included PUSCH or sPUSCH is transmitted on the carrier $C_n$ in the given time interval, and physical layer channels respectively corresponding to the first radio signal and the low latency radio signal are UCI-excluded PUSCH or sPUSCHs.

In one affiliated embodiment of the above subembodiment, a UCI-excluded PUSCH or sPUSCH is transmitted on the carrier $C_n$ in the given time interval, and physical layer channels respectively corresponding to the first radio signal and the low latency radio signal are UCI-excluded PUSCHs or sPUSCHs.

In one embodiment, the first power is $P_1(j)$, the first ideal power is $P_1^{Ideal}$, the second power is $P_2(j)$, the second ideal power is $P_2^{Ideal}$, the third power is $P_{Remain}(j)$, a sum of $P_1^{Ideal}$ and $P_2^{Ideal}$ is greater than $P_{Remain}(j)$, and $P_2^{Ideal}$ is not greater than $P_{Reserved,C_2}$, $P_1(j)$ and $P_2(j)$ meet the following formula:

$$P_1(j)=w_1 \cdot P_1^{Ideal} \text{ and } w_1 \cdot P_1^{Ideal} \leq P_{Remain}(j)-P_2^{Ideal}$$

$$P_2(j)=P_2^{Ideal}$$

Herein $w_1$ is the first scaling factor, and $w_1$ is a real number not less than 0 and not greater than 1.

In one subembodiment, $P_{Remain}(j)$ corresponds to the third power.

In one subembodiment, the j represents a position number of the given time interval in a given subframe. The given subframe is a subframe occupied by the given time interval.

In one subembodiment, the $P_{Remain}(j)$ meets the following formula:

$$P_{Remain}(j) = P_{TMAX} - \sum_{C_n \neq C_1, C_n \neq C_2}^{C_M} P_{C_n}(j)$$

Herein, the $P_{TMAX}$ is a greatest uplink transmitting power of the UE, the $P_{C_n}(j)$ is a transmitting power on the carrier $C_n$ in a given time interval. The $$\sum_{C_n \neq C_1, C_n \neq C_2}^{C_M} P_{C_n}(j)$$

corresponds to the fourth power, the carrier $C_1$ corresponds to the first carrier, the carrier $C_2$ corresponds to the second carrier, the carrier set $C_M$ corresponds to all carriers on which uplink transmissions are simultaneously performed by the UE in the time interval. The carrier $C_n$ is a carrier other than the first carrier and the second carrier.

In one affiliated embodiment of the subembodiment, a PUCCH or sPUCCH is transmitted on the carrier $C_n$ in the given time interval.

In one affiliated embodiment of the subembodiment, a UCI-included PUCCH or sPUCCH is transmitted on the carrier $C_n$ in the given time interval, and physical layer channels respectively corresponding to the first radio signal and the low latency radio signal are UCI-excluded PUSCHs or sPUSCHs.

In one affiliated embodiment of the subembodiment, a UCI-excluded PUSCH or sPUSCH is transmitted on the carrier $C_n$ in the given time interval, and physical layer channels respectively corresponding to the first radio signal and the low latency radio signal are UCI-excluded PUSCHs or sPUSCHs.

In one embodiment, the first power is $P_1(j)$, the first ideal power is $P_1^{Ideal}$, the second power is $P_2(j)$, the second ideal power is $P_2^{Ideal}$ the third power is $P_{Remain}(j)$, a sum of $P_1^{Ideal}$ and $P_2^{Ideal}$ is greater than $P_{Remain}(j)$, and $P_2^{Ideal}$ is greater than $P_{Reserved,C_2}$, $P_1(j)$ and $P_2(j)$ meet the following formula:

$$P_1(j)=w_1 \cdot P_1^{Ideal} \text{ and } P_1(j) \leq w_1 \cdot (P_{Remain}(j)-P_{Reserved,C_2})$$

$$P_2(j)=P_{Reserved,C_2}+w_2(P_{Remain}(j)-P_{Reserved,C_2})$$

Herein $w_1$ is the first scaling factor, $w_2$ is the second scaling factor, and both $w_1$ and $w_2$ are real numbers greater than or equal to 0, and less than or equal to 1.

In one subembodiment, $P_{Remain}(j)$ corresponds to the third power.

In one subembodiment, $P_{Remain}(j)-P_{Reserved,C_2}$ corresponds to the fifth power.

In one subembodiment, a sum of the first scaling factor and the second scaling factor is equal to 1.

In one subembodiment, the j represents a position number of the given time interval in a given subframe. The given subframe is a subframe occupied by the given time interval.

In one subembodiment, the $P_{Remain}(j)$ meets the following formula:

$$P_{Remain}(j) = P_{TMAX} - \sum_{C_n \neq C_1, C_n \neq C_2}^{C_M} P_{C_n}(j)$$

Herein, the $P_{TMAX}$ is a maximum uplink transmitting power of the UE, the $P_{C_n}(j)$ is a transmitting power of the carrier $C_n$ in a given time interval. The $$\sum_{C_n \neq C_1, C_n \neq C_2}^{C_M} P_{C_n}(j)$$

corresponds to the fourth power, the carrier $C_1$ corresponds to the first carrier, the carrier $C_2$ corresponds to the second carrier, the carrier set $C_M$ corresponds to all carriers on which uplink transmissions are performed simultaneously by the UE in the time interval. The carrier $C_n$ is a carrier other than the first carrier and the second carrier.

In one affiliated embodiment of the above subembodiment, a PUCCH or sPUCCH is transmitted on the carrier $C_n$ in the given time interval.

In one affiliated embodiment of the above subembodiment, a UCI-included PUSCH or sPUSCH is transmitted on the carrier $C_n$ in the given time interval, and physical layer channels respectively corresponding to the first radio signal and the low latency radio signal are UCI-excluded PUSCHs or sPUSCHs.

In one affiliated embodiment of the above subembodiment, a UCI-excluded PUSCH or sPUSCH is transmitted on the carrier $C_n$ in the given time interval, and physical layer channels respectively corresponding to the first radio signal and the low latency radio signal are UCI-excluded PUSCHs or sPUSCHs.

In one embodiment, the R low latency radio signal(s) comprises(comprise) at least a given low latency radio signal. Time domain resources occupied by the given low latency radio signal(s) are out of the target time interval set, power(s) allocated to the given low latency radio signal is(are) given power(s) of the R power value(s). the first radio signal carries the first bit block between the first bit block and the first UCI, the given low latency radio signal carries the low latency radio signal between the low latency bit block and the low latency UCI; or the first radio signal carries the first UCI, the given low latency radio signal carries given low latency UCI, the first UCI is transmitted on a physical layer data channel, the given low latency UCI is transmitted on a physical layer control channel. The given power is equal to a product of a given scaling factor and a given ideal power, the given ideal power is a transmitting power of the given low latency radio signal without power scaling, the given scaling factor is less than the scaling factor.

In one subembodiment, in the above embodiment, the priority of a type of information carried by the given low latency radio signal is higher than that of information carried by the first radio signal. But as for power allocation, the priority of the given low latency radio signal is lower than that of the first radio signal.

In one subembodiment, the above embodiment is characterized in that: among the R low latency radio signal(s), there exists a given low latency radio signal located outside the target time interval set (i.e. outside an observation window), and the priority of the given low latency radio signal is higher than that of the first radio signal. But the power allocation and power scaling are still performed according to the priority of a first low latency radio signal and the first radio signal observed in the first time interval. When the priority of the first low latency radio signal is lower than that of the first radio signal, the first radio signal still takes precedence in power allocation, namely, a transmitting power of the given low latency radio signal still needs to be multiplied by a scaling factor. Wherein the first low latency radio signal is a low latency radio signal in the first time interval.

In one embodiment, the R low latency radio signal(s) comprises(comprise) at least a given low latency radio signal. Time domain resources occupied by the given low latency radio signal(s) is(are) out of the target time interval set, power(s) allocated to the given low latency radio signal(s) is(are) given power(s) of the R power value(s). the first radio signal carries the first bit block between the first bit block and the first UCI, the given low latency radio signal carries the low latency bit block between the low latency bit block and the low latency UCI; or the first radio signal carries the first UCI, the given low latency radio signal carries given low latency UCI, the first UCI is transmitted on a physical layer control channel, the given low latency UCI is transmitted on a physical layer data channel; the given power is equal to a product of a given scaling factor and a given ideal power, the given ideal power is a transmitting power of the given low latency radio signal without power scaling, the given scaling factor is greater than the scaling factor.

In one subembodiment, in the above embodiment, the priority of a type of information carried by the given low latency radio signal is equal to or less than that of information carried by the first radio signal. However as for power allocation, the priority of the given low latency radio signal is higher than that of the first radio signal.

In one subembodiment, the above embodiment is characterized in that: among the R low latency radio signal(s), there exists a given low latency radio signal located out of the target time interval set (observation window), and the priority of the given low latency radio signal is less than that of the first radio signal. But the power allocation and power scaling are still performed according to the priority of the first low latency radio signal and the first radio signal observed in the first time interval. When the priority of the first low latency radio signal is higher than that of the first radio signal, the first low latency radio signal still takes precedence in power allocation, namely, a transmitting power of the given low latency radio signal still needs to be multiplied by a given scaling factor, and the given scaling factor is greater than the scaling factor. Wherein the first low latency radio signal is a low latency radio signal in the first time interval.

According to one aspect of the present disclosure, the above method is characterized in that the R time interval(s) is(are) out of the target time interval set; a first ideal power is less than or equal to a fifth power, the first power is equal to the first ideal power; or a first ideal power is greater than a fifth power, the first power is equal to a product of a fifth power and a first scaling factor; for any given low latency radio signal of the R low latency radio signal(s), a corresponding transmitting power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling; the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval, the fifth power is a difference between the third power and a first reserved power.

In one embodiment, the above method is characterized in that the first reserved power is allocated to the given low latency radio signal. When the given low latency radio signal needs to be transmitted with a smaller power, the second power that corresponds is transmitted with the second ideal power. When the given low latency radio signal needs to be transmitted with a smaller power, the second power that corresponds is greater than the first reserved power.

In one embodiment, the above method is further characterized in that the first radio signal takes precedence over the given low latency radio signal in power allocation.

In one embodiment, the start time of the time window of the first radio signal is previous to that of the R low latency radio signal(s).

In one embodiment, a sum of the first scaling factor and the second scaling factor is equal to 1.

According to one aspect of the present disclosure, the above method is characterized in that time domain resources occupied by R3 low latency radio signal(s) of the R low latency radio signal(s) belong to the target time interval set, the R3 is a positive integer; the R3 low latency radio signal(s) comprises(comprise) V1 low latency radio signal(s), V2 low latency radio signal(s) and V3 low latency radio signal(s); the V1, V2 and V3 are non-negative integers, respectively; a sum of the V1, V2 and V3 is equal to the R3; the V1 low latency radio signal(s) is(are) transmitted by physical layer control channel(s) respectively, the V2 low latency radio signal(s) is(are) transmitted by physical layer data channel(s) respectively, comprising the low latency UCI, the V3 low latency radio signal(s) is(are) transmitted on physical layer data channel(s) respectively, not comprising the low latency UCI; the V1 is greater than 0, the first low latency radio signal is a low latency radio signal with a greatest transmitting power in the V1 low latency radio signal(s) without power scaling; or the V1 is equal to 0 and V2 is greater than 0, the first low latency radio signal is a low latency radio signal with a greatest transmitting power in the V2 low latency radio signal(s) without power scaling; or both the V1 and V2 are equal to 0, the first low latency radio signal is a low latency radio signal with a greatest transmitting power in the R3 low latency radio signal(s) without power scaling.

In one embodiment, the above method is characterized in that time resources occupied by multiple low latency radio signals of the R low latency radio signal(s) belong to the target time interval set, the first low latency radio signal used for reference to power scaling and power allocation is a low latency radio signal with a maximum power in the multiple low latency radio signals; the method enables the UE to perform power scaling more accurately, in case that the total transmitting power exceeds a maximum total transmitting power of the UE.

According to one aspect of the present disclosure, the above method comprises:

receiving a first signaling, the first signaling is used for determining a first power control parameter;

wherein, the first power control parameter comprises at least the former of the first ideal power and the first scaling factor.

In one embodiment, the above method is characterized in that the first ideal power is configurable, so that the system can perform power allocation and power scaling in a more flexible manner.

In one embodiment, the first signaling comprises configuration parameters of the first ideal power, a physical layer channel corresponding to the first radio signal is a PUCCH or sPUCCH, configuration parameters of the first ideal power comprise at least one of $P_{CMAX,c_1}(j)$, $g(j)$, $P_{0\_PUCCH}$, $\Delta_{F\_PUCCH,c_1}(F)$, $\Delta_{TxD,c_1}(F')$ and $h(n_{CQI}, n_{HARQ}, n_{SR})$. $n_{CQI}$, $n_{HARQ}$ and $n_{SR}$ respectively indicate number of Channel Quality Indicator (CQI) information bits, number of HARQ-ARC bits and symbols of transmitting Scheduling Requests (SR); the specific meaning can be found in 3GPP Technical Specification (TS) 36.213, chapter 5.1.

In one embodiment, the first signaling comprises configuration parameters of the first ideal power, a physical layer channel corresponding to the first radio signal is a PUSCH or sPUSCH, configuration parameters of the first ideal power comprise at least one of $P_{CMAX,c_1}(j)$, $f_{c_1}(j)$, $P_{0\_PUSCH,c_1}$, $\Delta_{TxD}(F)$ and $\alpha_{c_1}(j)$; the specific meaning can be found in 3GPP Technical Specification (TS) 36.213, chapter 5.1.

According to one aspect of the present disclosure, the above method comprises:

receiving a second signaling, the second signaling is used for determining a second power control parameter;

wherein the second power control parameters comprise at least the former two of the first reserved power, the second ideal power and the second scaling factor.

In one embodiment, the above method is characterized in that the second ideal power is configurable, so that the system can perform power allocation and power scaling in a more flexible manner.

In one embodiment, the second signaling comprises configuration parameter of the first reserved power, the configuration parameter of the first reserved power is: percentage of the the first reserved power in a total transmitting power of the UE.

In one subembodiment, a total transmitting power of the UE corresponds to $P_{TMAX}$.

In one subembodiment, a configuration parameter of the first reserved power is γ. γ is a integer not less than 0 and not greater than 15, and integers from 0 to 15 are respectively used for indicating 0%, 5%, 10%, 15%, 20%, 30%, 37%, 44%, 50%, 56%, 63%, 70%, 80%, 90%, 95% and 100% of a total transmitting power of the UE.

In one embodiment, the second signaling comprises configuration parameter of the second ideal power, a physical layer channel corresponding to the first low latency radio signal is a PUCCH or sPUCCH, configuration parameters of the second ideal power comprise at least one of $P_{CMAX,C_2}(j)$, $g(j)$, $P_{0\_PUCCH}$, $\Delta_{F\_PUCCH,C_2}(F)$, $\Delta_{TxD,C_2}(F')$ and $h(n_{CQI}, n_{HARQ}, n_{SR})$; the specific meaning can be found in 3GPP Technical Specification (TS) 36.213, chapter 5.1.

In one embodiment, the second signaling comprises configuration parameters of the second ideal power, a physical layer channel corresponding to the first low latency radio signal is a PUSCH or sPUSCH, configuration parameters of the second ideal power comprise at least one of $P_{CMAX,C_2}(j)$, $f_{C_2}(j)$, $P_{0\_PUSCH,C_2}$, $\Delta_{TxD,C_2}(j)$ and $\alpha_{C_2}(j)$; the specific meaning can be found in 3GPP Technical Specification (TS) 36.213, chapter 5.1.

The present disclosure provides a method in a base station for low latency communication, comprising:

detecting a first radio signal on a first carrier;

detecting R low latency radio signal(s) on a second carrier;

wherein a transmitting power of the first radio signal is a first power, transmitting power(s) of the R low latency radio signal(s) correspond(s) to R power value(s) respectively; for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI information; the first radio signal comprises L sub-radio signals, the L sub-radio signals occupy L time intervals respectively, the L is a positive integer greater than 1; time domain resources occupied by the R low latency radio signal(s) belong to R time interval(s) respectively, the R time interval(s) is(are) R of the L time intervals, the R is a positive integer; the low latency radio signal carries at least one of a low latency bit block and low latency UCI; a target time interval set comprises L1 time interval(s), the L1 is a positive integer less than or equal to the L; at least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one embodiment, detecting a first radio signal on a first carrier refers to: judging value of the first power. If the first power is greater than a given threshold, a first radio signal is received on a first carrier; if a first power I not greater than a given threshold, reception of a first radio signal is dropped on a first carrier.

In one subembodiment, the reception is demodulation and decoding.

In one subembodiment, the dropping of reception is non-performance of demodulation and decoding.

In one subembodiment, judging a value of the first power refers to: judging a value of a first power according to a power of uplink modulation reference signal corresponding to the first radio signal.

In one embodiment, the phrase detecting R low latency radio signal(s) on the second carrier refers to: judging the R power value(s) corresponding to the R low latency radio signal(s). if a given power is greater than a given threshold, a given low latency radio signal is received with a given power on a second carrier; if a given power is not greater than a given threshold, reception of a given low latency radio signal is dropped on a second carrier.

In one subembodiment, the given power is one of the R power value(s), the given low latency radio signal is a low latency radio signal corresponding to the given power in the R low latency radio signal(s).

In one subembodiment, the reception is demodulation and decoding.

In one subembodiment, the dropping of reception is non-performance of demodulation and decoding.

In one subembodiment, judging the R power value(s) corresponding to the R low latency radio signal(s): judging a value of a given power according to power of uplink modulation reference signal corresponding to a given low latency radio signal. A transmitting power of the given low latency radio signal is the given power.

In one subembodiment, the given threshold is either invariant or configurable.

In one subembodiment, the given threshold is 0.

According to one aspect of the present disclosure, the above method is characterized in that at least a first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted on a physical layer data channel, the low latency UCI is transmitted on a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; a second ideal power is less than or equal to a third power, the second power is equal to the second ideal power; or a second ideal power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmitting power and a fourth power, the fourth power is a total transmitting power of transmitter of the first radio signal on carriers other than the first carrier and the second carrier in the first time interval.

According to one aspect of the present disclosure, the above method is characterized in that at least a first time interval of the R time interval(s) belongs to the target time interval set; the first radio signal carries the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; a first ideal power is less than or equal to a difference between a third power and a first reserved power, the first power is equal to the first ideal power; or a first ideal power is greater than a difference between a third power and a first reserved power, the first power is less than or equal to a difference between a third power and a first reserved power; the first ideal power is a transmitting power of the first radio signal without power scaling, the second ideal power is a transmitting power of the first low latency radio signal without power scaling, the third power is a difference between a maximum total transmitting power and a fourth power, the fourth power is a total transmitting power of transmitter of the first radio signal on carriers other than the first carrier and the second carrier in the first time interval.

According to one aspect of the present disclosure, the above method is characterized in that at least a first time interval of the R time interval(s) belongs to the target time interval set; the first radio signal carries the first bit block between the first bit block and the first UCI, the first low latency radio signal carries the low latency radio signal between the low latency bit block and the low latency UCI; or the first radio signal carries the first UCI, the first low latency radio signal carries the low latency UCI, the first UCI is transmitted on a physical layer control channel, the low latency UCI is transmitted on a physical layer control channel; or the first radio signal carries first UCI, the first low latency radio signal carries the low latency UCI, the first UCI is transmitted on a physical layer data channel, the low latency UCI is transmitted on a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power and a second ideal power is less than or equal to a first reserved power, the second power is equal to a second ideal power, the first power is less than or equal to a difference between the third power and a second ideal power; or a sum of a first ideal power and a second ideal power is greater than a third power and a second ideal power is greater than a first reserved power, the first power is less than or equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are real numbers not less than 0 and not greater than 1, respectively. The third power is a difference between a maximum total transmitting power and a fourth power, the fourth power is a total transmitting power of transmitter of the first radio signal on carriers other than the first carrier and the second carrier in the first time interval, the fifth power is equal to a difference between the third power and a first reserved power.

According to one aspect of the present disclosure, the above method is characterized in that the R time interval(s) is(are) out of the target time interval set; a first ideal power is less than or equal to a fifth power, the first power is equal to the first ideal power; or a first ideal power is greater than a fifth power, the first power is equal to a product of a fifth power and a first scaling power; for any given low latency radio signal of the R low latency radio signal(s), a corresponding power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling, the first ideal power is a transmitting power of the first radio signal without power scaling, the third power is a difference between a maximum total transmitting power and a fourth power, the fourth power is a total transmitting power of transmitter of the first radio signal on carriers other than the first carrier and the second carrier, the fifth power is equal to a difference between the third power and a first reserved power.

According to one aspect of the present disclosure, the above method is characterized in that time domain resources occupied by R3 low latency radio signal(s) of the R low latency radio signal(s) belong to the target time interval set, the R3 is a positive integer; the R3 low latency radio signal(s) comprises V1 low latency radio signal(s), V2 low latency radio signal(s) and V3 low latency radio signal(s); the V1, V2 and V3 are non-negative integers, respectively; a sum of the V1, V2 and V3 is equal to the R3; the V1 low latency radio signal(s) is(are) transmitted on physical layer control channel(s) respectively, the V2 low latency radio signal(s) is(are) transmitted by physical layer data channel(s) respectively, comprising the low latency UCI, the V3 low latency radio signal(s) is(are) transmitted by physical layer data channel(s) respectively, not comprising the low latency UCI; the V1 is greater than 0, the first low latency radio signal is a low latency radio signal with a greatest transmitting power in the V1 low latency radio signal(s) without power scaling; or the V1 is equal to 0 and the V2 is greater than 0, the first low latency radio signal is a low latency radio signal with a greatest transmitting power in the V2 low latency radio signal(s) without power scaling; or both the V1 and V2 are equal to 0, the first low latency radio signal is a low latency radio signal with a greatest transmitting power in the V3 low latency radio signal(s) without power scaling.

According to one aspect of the present disclosure, the above method comprises:

transmitting a first signaling, the first signaling is used for determining a first power control parameter;

wherein, the first power control parameter comprises at least the former of the first ideal power and the first scaling factor.

According to one aspect of the present disclosure, the above method comprises:

transmitting a second signaling, the second signaling is used for determining a second power control parameter;

wherein, the second power control parameter comprises at least the former two of the first reserved power, the second ideal power and the second scaling factor.

The present disclosure provides a UE for low latency communication, comprising:

a first transceiver, determining a first power, and transmitting a first radio signal with a first power on a first carrier;

a second transceiver, determining R power value(s), and transmitting R low latency radio signal(s) with the R power value(s) respectively on a second carrier;

Wherein, for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s) respectively, the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

According to one aspect of the present disclosure, the above UE is characterized in that the first transceiver further receives a first signaling, the first signaling is used for determining a first power control parameter, the first power control parameter comprises at least the former of the first ideal power and the first scaling factor.

According to one aspect of the present disclosure, the above UE is characterized in that the second transceiver further receives a second signaling, the second signaling is used for determining a second power control parameter, the second power control parameter comprises at least the former two of the first reserved power, the second ideal power and the second scaling factor.

According to one aspect of the present disclosure, the above UE is characterized in that at least a first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted on a physical layer data channel, the low latency UCI is transmitted on a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; a second ideal power is less than or equal to a third power, the second power is equal to the second ideal power; or a second ideal power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval.

According to one aspect of the present disclosure, the above UE is characterized in that at least a first time interval of the R time interval(s) belongs to the target time interval set; the first radio signal carries the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; a first ideal power is less than or equal to a difference between a third power and a first reserved power, the first power is equal to the first ideal power; or a first ideal power is greater than a difference between a third power and a first reserved power, the first power is less than or equal to a difference between a third power and a first reserved power; the first ideal power is a transmitting power of the first radio signal without power scaling, the second ideal power is a transmitting power of the first low latency radio signal without power scaling, the third power is a difference between a maximum transmitting power and a fourth power, the fourth power is a total transmitting power of the UE on carriers other than the first carrier and the second carrier in the first time interval.

According to one aspect of the present disclosure, the above UE is characterized in that at least a first time interval of the R time interval(s) belongs to the target time interval set; the first radio signal carries the first bit block between the first bit block and the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical layer control channel; or the first radio signal carries first UCI, the first low latency radio signal carries the low latency UCI, the first UCI is transmitted on a physical layer data channel, the low latency UCI is transmitted on a physical layer data channel; a sum of a first ideal power and a second power is less than or equal to a third power, the first power is equal to a first ideal power, the second power is equal to a second ideal power; or a sum of a first ideal power and a second ideal power is greater than a third power and a second ideal power is less than or equal to a first reserved power, the second power is equal to a second ideal power, the first power is less than or equal to a difference between the third power and a second ideal power; or a sum of a first ideal power and a second ideal power is greater than a third power and a second ideal power is greater than a first reserved power, the first power is less than or equal to a product of a fifth power and a first scaling factor, a difference between the second power and a first reserved power is equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are real numbers not less than 0 and not greater than 1, respectively; the third power is a difference between a maximum total transmitting power and a fourth power, the fourth power is a total transmitting power of the UE on carriers other than the first carrier and the second carrier in the first time interval, the fifth power is a difference between the third power and a first reserved power.

According to one aspect of the present disclosure, the above UE is characterized in that the R time interval(s) is(are) out of the target time interval; a first ideal power is less than or equal to a fifth power, the first power is equal to the first ideal power; or a first ideal power is greater than a fifth power, the first power is equal to a product of a fifth power and a first scaling factor; for any given low latency radio signal of the R low latency radio signal(s), a corresponding power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval, the fifth power is equal to a difference between the third power and a first reserved power.

According to one aspect of the present disclosure, the above UE is characterized in that time domain resources occupied by R3 low latency radio signal(s) of the R low latency radio signal(s) belong to the target time interval set, the R3 is a positive integer; the R3 low latency radio signal(s) comprises(comprise) V1 low latency radio signal(s), V2 low latency radio signal(s) and V3 low latency radio signal(s); the V1, V2 and V3 are non-negative integers, respectively; a sum of the V1, V2 and V3 is equal to the R3; the V1 low latency radio signal(s) is(are) transmitted by physical layer control channel(s) respectively, the V2 low latency radio signal(s) is(are) transmitted by physical layer data channel(s) respectively, comprising the low latency UCI, the V3 low latency radio signal(s) is(are) transmitted by physical layer data channel(s) respectively, not comprising the low latency UCI; the V1 is greater than 0, the first low latency radio signal is a low latency radio signal with a greatest transmitting power in the V1 low latency radio signal(s) without power scaling; or the V1 is equal to 0 and the V2 is greater than 0, the first low latency radio signal is a low latency radio signal with a greatest transmitting power in the V2 low latency radio signal(s) without power scaling; or both the V1 and the V2 are equal to 0, the first low latency radio signal is a low latency radio signal with a greatest transmitting power in the V3 low latency radio signal(s) without power scaling.

The present disclosure provides a base station device for low latency communication, comprising:

a third transceiver, detecting a first radio signal on a first carrier;

a fourth transceiver, detecting R low latency radio signal(s) on a second carrier;

wherein, a transmitting power of the first radio signal is a first power, transmitting power(s) of the R low latency radio signal(s) correspond(s) to R power value(s); for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time interval respectively, the L is a positive integer greater than 1; time domain resources occupied by the R low latency radio signal(s) belong to R time interval(s) respectively, the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmitting power of the first low latency radio signal is a second power, the first power is used for determining the second power or the second power is used for determining the first power, time domain resources occupied by the low latency radio signal belong to first time interval; or the R time interval(s) is(are) out of the target time interval, the first power is used for determining the R power value(s); the first time interval is one of the R time interval(s).

According to one aspect of the present disclosure, the above base station device is characterized in that the third transceiver further transmits a first signaling, the first signaling is used for determining a first power control parameter, the first power control parameter comprises at least the former of the first ideal power and the first scaling factor.

According to one aspect of the present disclosure, the above base station device is characterized in that the fourth transceiver further transmits a second signaling, the second signaling is used for determining a second power control parameter, the second power control parameter comprises at least the former two of the first reserved power, the second ideal power and the second scaling factor.

According to one aspect of the present disclosure, the above base station device is characterized in that at least a first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted on a physical layer data channel, the low latency UCI is transmitted on a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; a second ideal power is less than or equal to a third power, the second power is equal to the second ideal power; or a second ideal power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmitting power and a fourth power, the fourth power is a total transmitting power of transmitter of the first radio signal on carriers other than the first carrier and the second carrier in the first time interval.

According to one aspect of the present disclosure, the above base station device is characterized in that at least a first time interval of the R time interval(s) belongs to the target time interval set; the first radio signal carries the first UCI, the first low latency radio signal carries the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; a first ideal power is less than or equal to a difference between a third power and a first reserved power, the first power is equal to the first ideal power; or a first ideal power is greater than a difference between a third power and a first reserved power, the first power is less than or equal to a difference between a third power and a first reserved power; the first ideal power is a transmitting power of the first radio signal without power scaling, the second ideal power is a transmitting power of the first low latency radio signal without power scaling, the third power is a difference between a maximum total transmitting power and a fourth power, the fourth power is a total transmitting power of transmitter of the first radio signal on carriers other than the first carrier and the second carrier in the first time interval.

According to one aspect of the present disclosure, the above base station device is characterized in that at least a first time interval of the R time interval(s) belongs to the target time interval; the first radio signal carries the first bit block between the first bit block and the first UCI, the first low latency radio signal carriers the low latency bit block between the low latency bit block and the low latency UCI; or the first radio signal carries the first UCI, the first low latency radio signal carries the low latency UCI, the first UCI is transmitted on a physical layer control channel, the low latency UCI is transmitted on a physical control channel; nor the first radio signal carries first UCI, the first low latency radio signal carries the low latency UCI, the first UCI is transmitted on a physical layer data channel, the low latency UCI is transmitted on a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power and a second ideal power is less than or equal to a first reserved power, the second power is equal to a second ideal power; or a sum of a first ideal power and a second ideal power is greater than a third power and a second ideal power is less than or equal to a first reserved power, the second power is equal to a second ideal power, the first power is less than or equal to a difference between the third power and a second ideal power; or a sum of a first ideal power and a second ideal power is greater than a third power and a second ideal power is greater than a first reserved power, the first power is less than or equal to a product of a fifth power and a first scaling power, a difference between the second power and a first reserved power is equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are real numbers not less than 0 and not greater than 1, respectively; the third power is a difference between a maximum total transmitting power and a fourth power, the fourth power is a total transmitting power of transmitter of the first radio signal on carriers other than the first carrier and the second carrier in the first time interval, the fifth power is a difference between the third power and a first reserved power.

According to one aspect of the present disclosure, the above base station device is characterized in that the R time interval(s) is(are) out of the target time interval set; a first ideal power is less than or equal to a fifth power, the first power is equal to the first ideal power; or a first ideal power is greater than a fifth power, the first power is equal to a product of a fifth power and a first scaling factor. For any given low latency radio signal of the R low latency radio signal(s), a corresponding power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling, the first ideal power is a transmitting power of the first radio signal without power scaling, the third power is a difference between a maximum total transmitting power and a fourth power, the fourth power is a total transmitting power of transmitter of the first radio signal on carriers other than the first carrier and the second carrier in the first time interval, the fifth power is equal to a difference between the third power and a first reserved power.

According to one aspect of the present disclosure, the above base station device is characterized in that time domain resources occupied by R3 low latency radio signal(s) of the R low latency radio signal(s) belong(s) to the target time interval set, the R3 is a positive integer; the R3 low latency radio signal(s) comprises(comprise) V1 low latency radio signal(s), V2 low latency radio signal(s) and V3 low latency radio signal(s); the V1, V2 and V3 are non-negative integers, respectively; a sum of the V1, V2 and V3 is equal to the R3; the V1 low latency radio signal(s) is(are) transmitted by physical layer control channel(s) respectively, the V2 low latency radio signal(s) is(are) transmitted by physical layer data channel(s) respectively, comprising the low latency UCI, the V3 low latency radio signal(s) is(are) transmitted by physical layer data channel(s) respectively, not comprising the low latency UCI; the V1 is greater than 0, the first low latency radio signal is a low latency radio signal with a greatest transmitting power in the V1 low latency radio signal(s) without power scaling; or the V1 is equal to 0 and the V2 is greater than 0, the first low latency radio signal is a low latency radio signal with a greatest transmitting power in the V2 low latency radio signal(s) without power scaling; or both the V1 and V2 are equal to 0, the first low latency radio signal is a low latency radio signal with a greatest transmitting power in the V3 low latency radio signal(s) without power scaling.

In one embodiment, compared with existing published technologies, the present disclosure has the following technical advantages:

Through the designs of the first reserved power, a transmitting power of the first low latency radio signal is guaranteed, so as to ensure the receiving performance of the low latency radio signal.

Through the design of the target time interval set, and power scaling is performed according to channel types of transmitting signals on the first carrier and the second carrier in a target time interval set, making it easier for power scaling among carriers in different sTTIs.

Through comparing types of information carried by the first radio signal and the low latency radio signal and corresponding physical layer channels, the first power and the R power value(s) are determined, and power is configured to control information that needs higher transmission performance, so that uplink transmission performance is improved.

Through the design of a first signaling and a second signaling, the first ideal power and the second ideal power are configured in a flexible manner. Power allocation is further improved.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
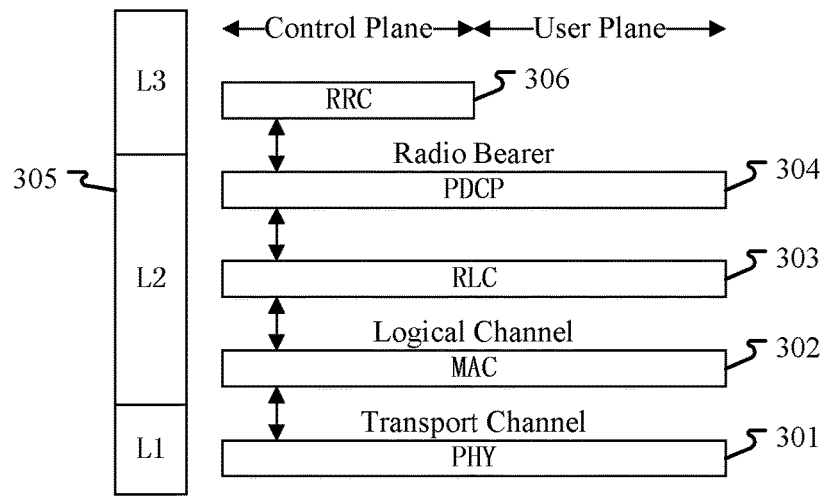
FIG. 1 is a diagram illustrating a wireless agreement framework of a user plane and a control plane according to one embodiment of the present disclosure.

Embodiment 1 illustrates a schematic diagram of a radio protocol architecture of a user plane and a control plane according to the present disclosure, as shown in FIG. 1. FIG. 1 illustrates a schematic diagram of a radio protocol architecture of a user plane and a control plane and a control plane. In FIG. 1, the radio protocol architecture of user equipment (UE) and Base Station Equipment (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet so as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e. resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture shown in FIG. 1 is applicable to the UE in the present disclosure.

In one subembodiment, the radio protocol architecture shown in FIG. 1 is applicable to the base station in the present disclosure.

In one subembodiment, the first signaling in the present disclosure is generated by the RRC sublayer 306.

In one subembodiment, the first signaling in the present disclosure is generated by the MAC sublayer 302.

In one subembodiment, the second signaling in the present disclosure is generated by the RRC sublayer 306.

In one subembodiment, the second signaling in the present disclosure is generated by the MAC sublayer 302.

Embodiment 2

Figure 2:
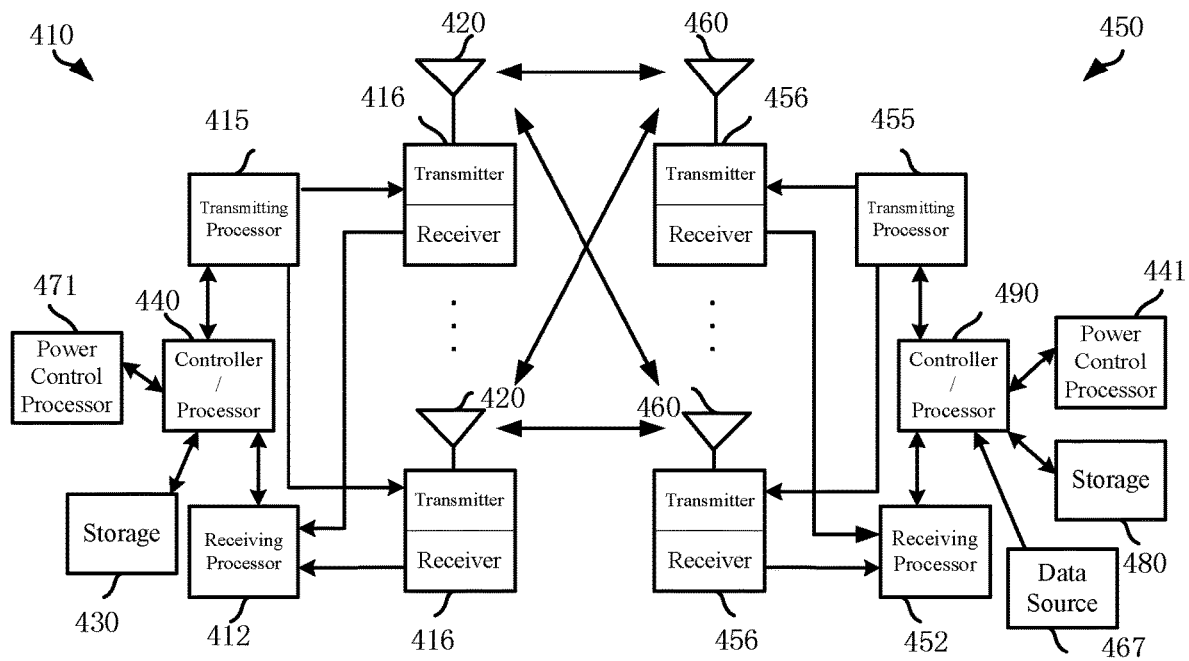
FIG. 2 is a diagram illustrating a base station device and a given UE according to one embodiment of the present disclosure.

Embodiment 2 illustrates an example of a base station device and a given UE according to the present disclosure, as shown in FIG. 2. FIG. 2 is a block diagram of a gNB 410 in communication with a UE 450 in an access network.

The base station equipment (410) comprises a controller/processor 440, a memory 430, a receiving processor 412, a transmitting processor 415, a power control processor 471, a transmitter/receiver 416 and an antenna 420.

The user equipment (UE 450) comprises a controller/processor 490, a memory 480, a data source 467, a transmitting processor 455, a receiving processor 452, a power control processor 441, a transmitter/receiver 456 and an antenna 460.

In the downlink transmission, the processing related to the base station equipment (410) comprises the following steps:

the upper-layer packet arrives at the controller/processor 440, which provides packet header compression, encryption, packet segmentation and reordering, and multiplexing and demultiplexing between the logical and transport channels for implementing the L2 layer protocol for the user plane and the control plane; the upper-layer packet may include data or control information, such as a Downlink Shared Channel (DL-SCH);

the controller/processor 440 may be associated with a memory 430 that stores program codes and data, the memory 430 may be a computer-readable medium;

the controller/processor 440 notifies a scheduling unit of the transmission request, and the scheduling unit is configured to schedule the air interface resource corresponding to the transmission requirement;

the transmitting processor 415 receives the output bit stream of controller/processor 440, and implements various signal transmission processing functions for the L1 layer (i.e. the physical layer) including coding, interleaving, scrambling, modulating, power control/allocation, and generates physics layer control signaling (including a PBCH, a PDCCH, a PHICH, a PCFICH, a reference signal), etc.;

the power control processor 471 performs predictions of transmitting powers of data symbols, control symbols or reference signal symbols, and determines the first power control parameter and the second power control parameter in the present disclosure; and outputs the result to the transmitting processor 415 via the controller/processor 440;

the transmitter 416 is configured to convert the baseband signals provided by the transmitting processor 415 into radio frequency signals and transmit the signals via the antenna 420; each transmitter 416 samples the respective input symbol streams to obtain respective sampled signal streams; each transmitter 416 performs further processing (such as digital to analog conversion, amplification, filtering, upconversion, etc.) on respective sampling streams to obtain downlink signals.

In the downlink transmission, the processing related to the user equipment (UE 450) may comprise the following steps:

the receiver 456 is configured to convert radio frequency signals received through the antenna 460 into baseband signals and provide the signals to the receiving processor 452;

the receiving processor 452 implements various signal transmission processing functions for the L1 layer (i.e. the physical layer) including decoding, deinterleaving, descrambling, demodulating, and physical layer control signaling extraction, etc.

the controller/processor 490 receives the bit stream output by the receiving processor 452, and provides packet header decompression, decryption, packet segmentation and reordering, and multiplexing and demultiplexing between the logical and transport channels for implementation of the L2 layer protocol for the user plane and the control plane;

the controller/processor 490 is associate with a memory 480 that stores program codes and data, the memory 480 may be a computer-readable medium.

In the uplink transmission, the processing related to the user equipment (UE 450) may comprise the following steps:

the data source 467 provides an upper-layer packet to controller/processor 490, which provides packet header compression, encryption, packet segmentation and reordering, and multiplexing and demultiplexing between the logical and transport channels for implementing the L2 layer protocol for the user plane and the control plane;

the controller/processor 490 is associated with a memory 480 that stores program codes and data, the memory 480 may be a computer-readable medium;

the power control processor 441 determines transmitting powers of data symbols, control symbols or reference signal symbols, and determines the first power and the R power value(s) in the present disclosure; and outputs the result to a transmitting processor 455 via a controller/processor 490;

the transmitting processor 455 receives the output bit stream of controller/processor 490, and implements various signal transmission processing functions for the L1 layer (i.e., the physical layer) including coding, interleaving, scrambling, modulating, power control/allocation, and generates physics layer control signaling, etc.;

the transmitter 456 is configured to convert the baseband signals provided by the transmitting processor 455 into radio frequency signals and transmit the signals via the antenna 460; each transmitter 456 samples the respective input symbol streams to obtain respective sampled signal streams; each transmitter 456 performs further processing (such as digital to analog conversion, amplification, filtering, upconversion, etc.) on the respective sampling streams to obtain uplink signals;

In the uplink transmission, the processing related to the base station equipment (410) may comprise the following steps:

the receiver 456 is configured to convert radio frequency signals received through the antenna 420 into baseband signals and provide the signals to the receiving processor 412;

the receiving processor 412 implements various signal transmission processing functions for the L1 layer (i.e., the physical layer) including decoding, deinterleaving, descrambling, demodulating, and physical layer control signaling extraction, etc.

the controller/processor 440 receives the bit stream output by the receiving processor 412, provides packet header decompression, decryption, packet segmentation and reordering, and multiplexing and demultiplexing between the logical and transport channels for implementation of the L2 layer protocol for the user plane and the control plane;

the controller/processor 440 may be associated with a memory 430 that stores program codes and data, the memory 430 may be a computer-readable medium.

In one embodiment, the UE 450 comprises: at least one processor and at least one memory, wherein the at least one memory comprises a computer program code; the at least one memory and the computer program code are configured to be used together with at least one processor. The UE 450 at least: determines a first power, transmitting a first radio signal with a first power on a first carrier; and determines R power value(s), transmitting R low latency radio signal(s) with the R power value(s) on a second carrier; for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s) respectively, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the UE comprises: a memory in which a computer-readable instruction program is stored, wherein the computer-readable instruction program generates an action when executed by at least one processor, the action comprises: determining a first power, transmitting a first radio signal with a first power on a first carrier; and determining R power value(s), transmitting R low latency radio signal(s) with the R power value(s) respectively on a second carrier; for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s), the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the gNB 410 device comprises: at least one processor and at least one memory, wherein the at least one memory comprises a computer program code; the at least one memory and the computer program code are configured to be used together with the at least one processor. The gNB 410 device at least: detects a first radio signal on a first carrier; and detects R low latency radio signal(s) on a second carrier; a transmitting power of the first radio signal is a first power, transmitting power (s) of the R low latency radio signal(s) correspond(s) to R power value(s) respectively; for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s) respectively, the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L. at least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the gNB 410 comprises: a memory in which a computer-readable instruction program is stored, wherein the computer-readable instruction program generates an action when executed by at least one processor, the action comprises: detecting a first radio signal on a first carrier; and detecting R low latency radio signal(s) on a second carrier; a transmitting power of the first radio signal is a first power, transmitting power(s) of the R low latency radio signal(s) correspond(s) to R power value(s);

for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s) respectively, the R time interval(s) is(are) R of the L time intervals, the R is a positive integer; the low latency radio signal carries at least one of a low latency bit block and low latency UCI; a target time interval comprises L1 time interval(s), the L1 time interval(s) is(are) L1 of the L time intervals, the L1 is a positive integer less than or equal to the L. At least a first time interval of the R time interval(s) belongs to the target time interval set, the R low latency radio signal(s) comprises (comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the UE 450 corresponds to the user equipment in the present disclosure.

In one subembodiment, the gNB 410 corresponds to the base station in the present disclosure.

In one subembodiment, at least the former two of a transmitter 456, a transmitting processor 455 and a controller/processor 490 are used to transmit a first radio signal with a first power on a first carrier.

In one subembodiment, at least the former two of a transmitter 456, a transmitting processor 455 and a controller/processor 490 are used to transmit R low latency radio signal(s) with the R power value(s) on a second carrier.

In one subembodiment, at least the former two of a receiver 416, a receiving processor 412 and a controller/processor 440 are used to detect a first radio signal on a first carrier.

In one subembodiment, at least the former two of a receiver 416, a receiving processor 412 and a controller/processor 440 are used to detect R low latency radio signal(s) on a second carrier.

In one subembodiment, at least the former two of a receiver 456, a receiving processor 452 and a controller/processor 490 are used to receive a first signaling in the present disclosure.

In one subembodiment, at least the former two of a receiver 456, a receiving processor 452 and a controller/processor 490 are used to receive a second signaling in the present disclosure.

In one subembodiment, a transmitter/receiver 416, a transmitting processor 415 and a controller/processor 440 are used to transmit a first signaling in the present disclosure.

In one subembodiment, a transmitter/receiver 416, a transmitting processor 415 and a controller/processor 440 are used to transmit a second signaling in the present disclosure.

In one subembodiment, a power processor 441 is used to determine a first power and R power value(s) in the present disclosure.

In one subembodiment, a power processor 471 is used to determine a first signaling and a second signaling in the present disclosure.

Embodiment 3

Figure 3:
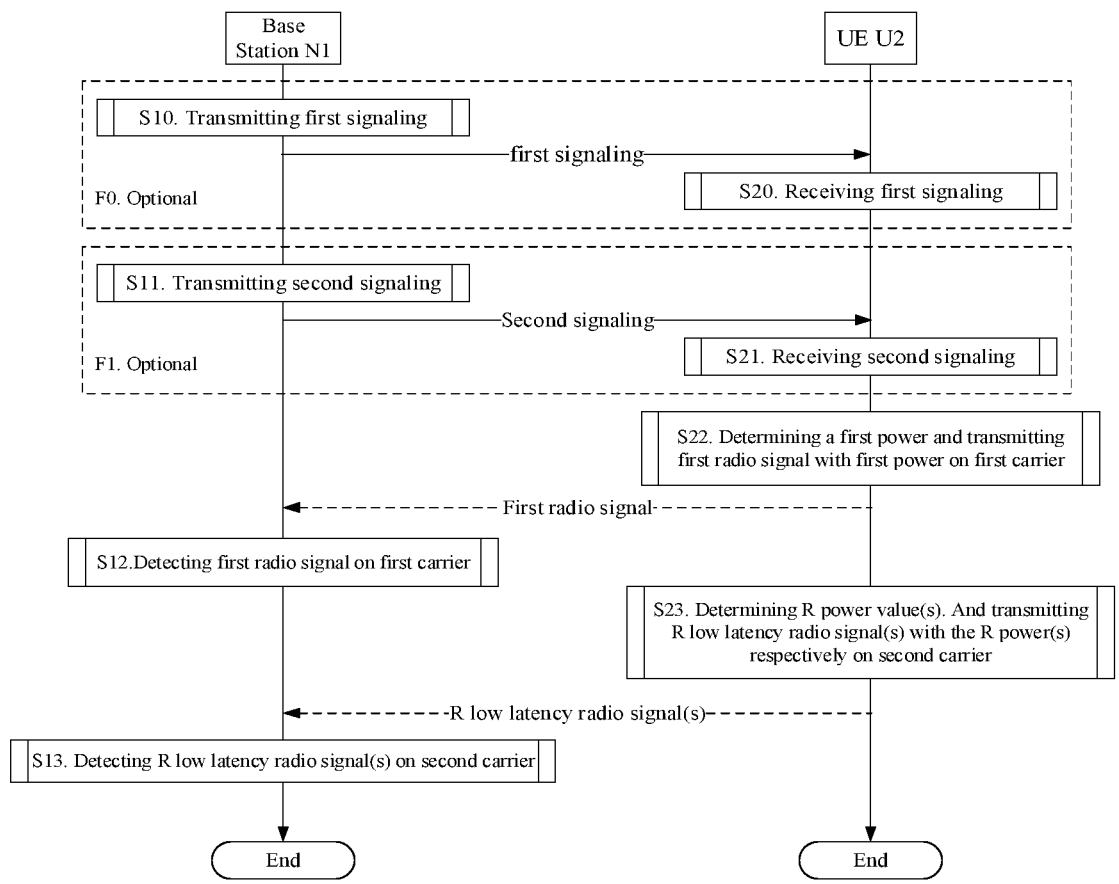
FIG. 3 is a flowchart of the transmission of the first radio signal and the R low latency radio signal(s) according to one embodiment of the present disclosure.

Embodiment 3 illustrates a flowchart of transmission of the first radio signal according to the present disclosure, as shown in FIG. 3. In FIG. 3, the base station N1 is a maintenance base station of the serving cell of the UE U2. The steps identified in block F0 and F1 of the figure are optional.

The base station N1 transmits a first signaling in step S10; transmits the a second signaling in step S11; detects a first radio signal on a first carrier in step S12; and detects R low latency radio signal(s) in step S13.

The UE U2 receives a first signaling in step S20; receives a second signaling in step S21; determines a first power in step S22, and transmits a first radio signal with a first power on a first carrier; determines R power value(s) in step S23; and transmits R low latency radio signal(s) with the R power(s) respectively on a second carrier.

In one subembodiment, the phrase detecting a first radio signal on a first carrier refers to: determining a value of the first power. If the first power is greater than a given threshold, a first radio signal is received on a first carrier; if a first power is not greater than a given threshold, reception of a first radio signal is dropped on a first carrier.

In one subembodiment, the phrase detecting R low latency radio signal(s) on a second carrier refers to: determining the R power value(s) corresponding to the R low latency radio signal(s). if a given power is greater than a given threshold, a given low latency radio signal is received with a given power on a second power; if a given power is not greater than a given threshold, reception of a given low latency radio signal is dropped on a second carrier.

In one affiliated embodiment of the above two subembodiments, the given threshold is invariant or configurable.

In one affiliated embodiment of the above two embodiments, the given threshold is 0.

In one affiliated embodiment of the above two embodiments, the reception is demodulation and decoding.

In one affiliated embodiment of the above two embodiments, the dropping of reception is non-performance of demodulation and decoding.

In one subembodiment, the first signaling is a cell-specific Radio Resource Control (RRC) signaling.

In one subembodiment, the first signaling is a UE-specific Radio Resource Control (RRC) signaling.

In one subembodiment, the first signaling is a sTTI-specific Radio Resource Control (RRC) signaling.

In one affiliated embodiment of the subembodiment, the phrase the first signaling is sTTI-specific refers to: the first scaling factor in the first signaling is related to duration time of the first radio signal in time domain.

In one subembodiment, the first information is a physical layer signaling.

In one subembodiment, the second signaling is a cell-specific RRC signaling.

In one subembodiment, the second signaling is a UE-specific RRC signaling.

In one subembodiment, the second signaling is a sTTI-specific RRC signaling.

In one affiliated embodiment of the subembodiment, the phrase the second signaling is sTTI-specific refers to: a value of the first reserved power in the second signaling is related to duration time of the first low latency radio signal in time domain.

Embodiment 4

Figure 4:
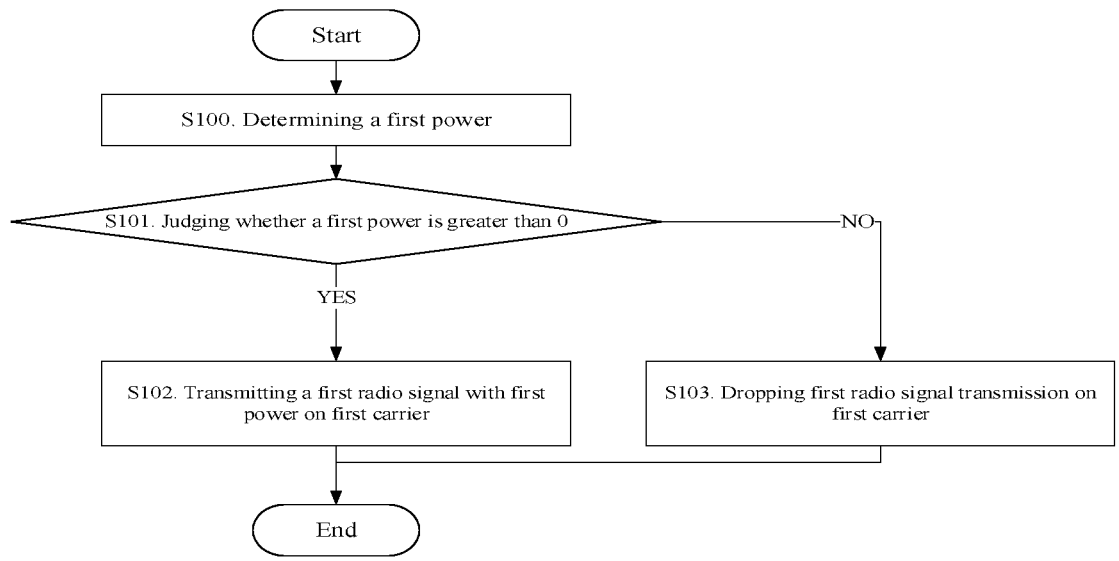
FIG. 4 is a flowchart of the determined first power on the UE side and the first radio signal according to one embodiment of the present disclosure.

Embodiment 4 illustrates a flowchart of the determined first power on the UE side and the first radio signal according to the present disclosure, as shown in FIG. 4.

In FIG. 4, the UE determines a first power in step S100, and determines whether a first power is greater than 0 in step S101. If a first power is greater than 0, the UE transmits a first radio signal with a first power on a first carrier in step S102. If a first power is not greater than 0, the UE drops a first signal transmission on a frist carrier in step S103.

In one subembodiment, all steps in FIG. 4 correspond to step S22 in FIG. 3.

Embodiment 5

Figure 5:
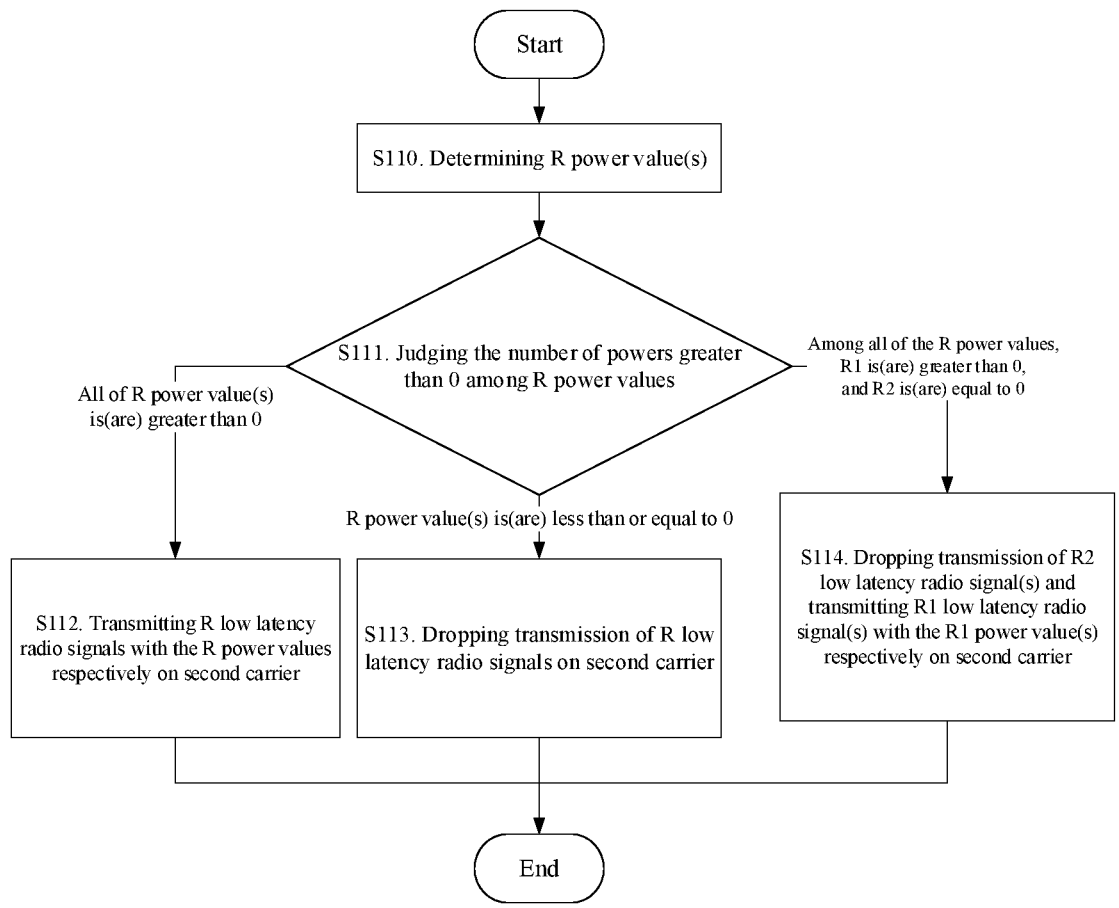
FIG. 5 is a flowchart of the determined R power value(s) on the UE side and the R low latency radio signal(s) according to one embodiment of the present disclosure.

Embodiment 5 illustrates a flowchart of the determined R power value(s) on the UE side and the R low latency radio signal(s) according to the present disclosure, as shown in FIG. 5.

In FIG. 5, the UE determines R power value(s) in step S110, and determines a number of power values greater than 0 among the R power value(s). if all of the R power value(s) is(are) greater than 0, R low latency radio signal(s) is(are) transmitted with the R power value(s) respectively on a second carrier in step S112. If the R power value(s) is(are) equal to 0, transmission of R low latency radio signal(s) is dropped on a second carrier in step S113. If R1 of the R power value(s) is(are) greater than 0, R2 of the R power value(s) is(are) equal to 0, transmission of R2 low latency radio signal(s) is dropped on a second carrier in step S114, and R1 low latency radio signal(s) is(are) transmitted with the R1 power value(s) respectively on a second carrier.

In one subembodiment, the R is a positive integer.

In one subembodiment, the R1 and the R2 are positive integers less than the R, the R is equal to a sum of the R1 and the R2.

In one subembodiment, the R1 low latency radio signal(s) and the R2 low latency radio signal(s) constitute the R low latency radio signals.

In one subembodiment, all steps in FIG. 5 correspond to step S23 in FIG. 3.

Embodiment 6

Figure 6:
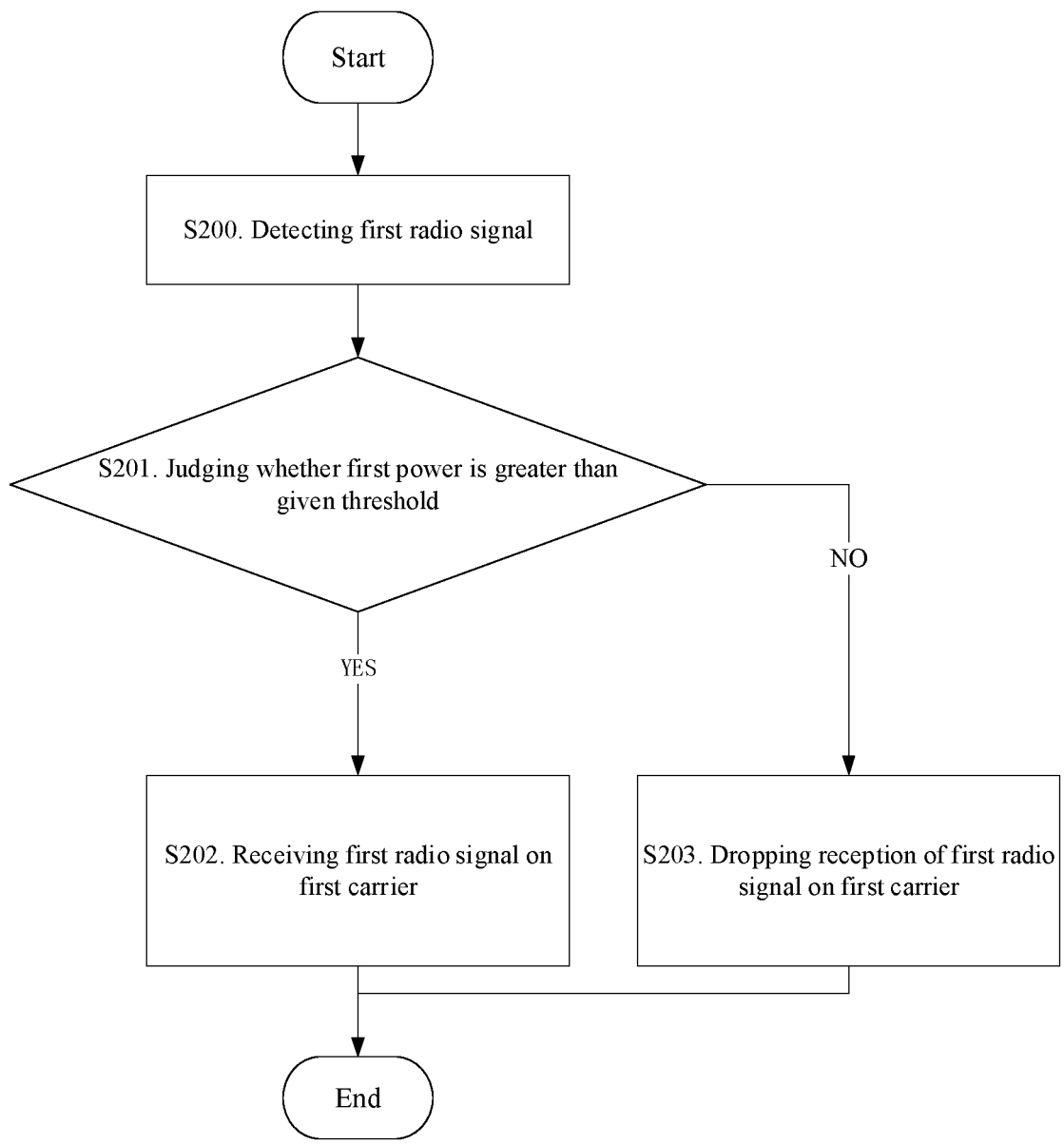
FIG. 6 is a flowchart of the detection of the first radio signal on the base station side according to one embodiment of the present disclosure.

Embodiment 6 illustrates a flowchart of the detection of the first radio signal on the base station side according to the present disclosure, as shown in FIG. 6.

In FIG. 6, the base station detects a first radio signal in step S200, and determines whether a first power is greater than a given threshold in step S201. If a first power is greater than a given threshold, the base receives a first radio signal on a first carrier in step S202. If a first power is not greater than a given threshold, the base station drops reception of a first radio signal on a first carrier in step S203.

In one subembodiment, all steps in FIG. 6 correspond to step S12 in FIG. 3.

In one embodiment, the given threshold is equal to 0.

Embodiment 7

Figure 7:
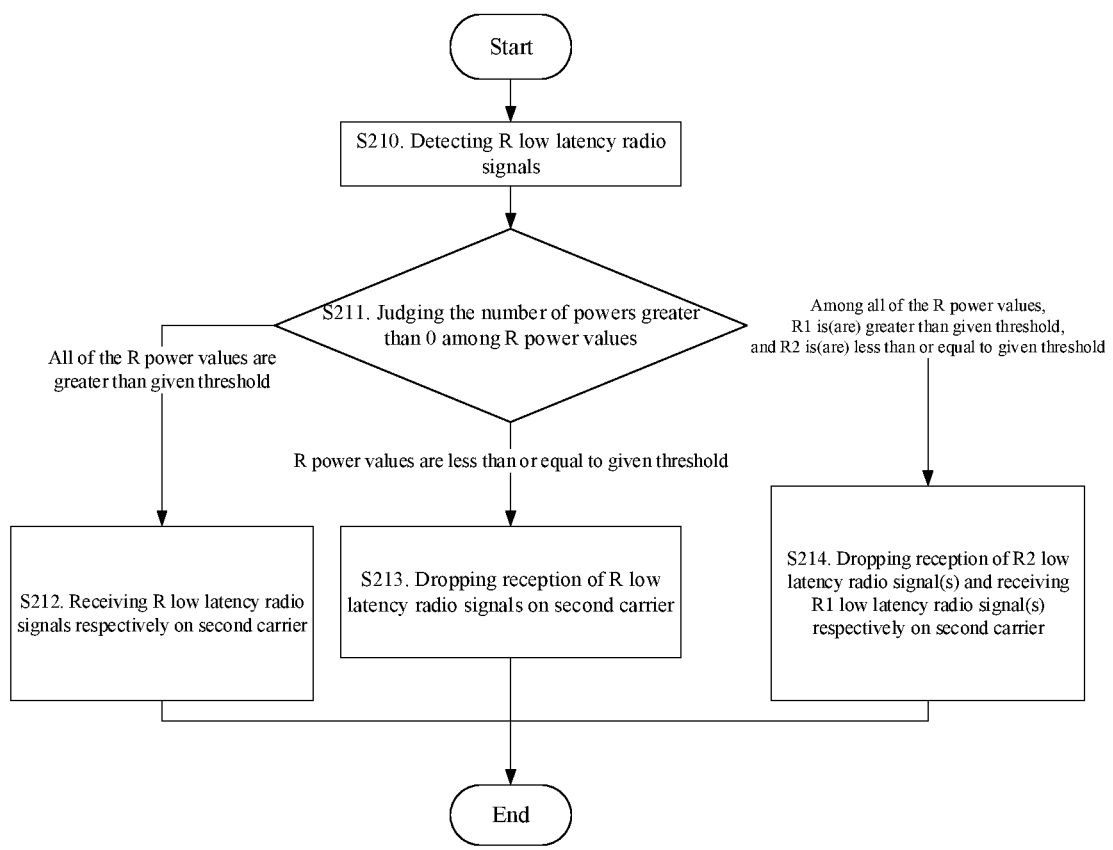
FIG. 7 is a flowchart of the detection of the R low latency radio signal(s) on the base station side according to one embodiment of the present disclosure.

Embodiment 7 illustrates a flowchart of the detection of the R low latency radio signal(s) on the base station side according to the present disclosure, as shown in FIG. 7.

In FIG. 7, the base station detects R low latency radio signal(s) in step S210, and determines a number of power values greater than a given threshold among the R power value(s). If all of the R power value(s) is(are) greater than a given threshold, R low latency radio signal(s) is(are) received respectively on a second carrier in step S212. If the R power value(s) is(are) not greater than a given threshold, reception of R low latency radio signal(s) is dropped on a second carrier in step S213. If R1 of the R power value(s) is(are) greater than a given threshold, R2 of the R power value(s) is(are) not greater than a given threshold, reception of R2 low latency radio signal(s) is dropped on a second carrier in step S214, and R1 low latency radio signal(s) is(are) received respectively on a second carrier.

In one subembodiment, the R is a positive integer.

In one subembodiment, the R1 and the R2 are positive integers less than the R, the R is equal to a sum of the R1 and the R2.

In one subembodiment, the R1 low latency radio signal(s) and the R2 low latency radio signal(s) constitute the R low latency radio signals.

In one subembodiment, all steps in FIG. 7 correspond to step S13 in FIG. 3.

In one embodiment, the given threshold is equal to 0.

Embodiment 8

Figure 8:
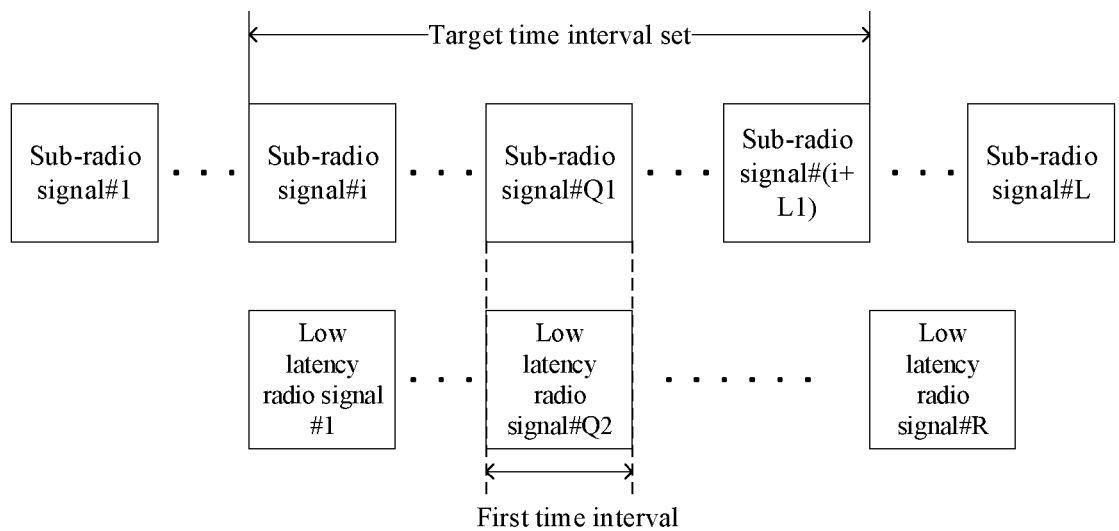
FIG. 8 is a diagram illustrating the L sub-radio signals and the R low latency radio signal(s) according to one embodiment of the present disclosure.

Embodiment 8 illustrates a diagram illustrating the L sub-radio signals and the R low latency radio signal(s) according to the present disclosure, as shown in FIG. 8. In FIG. 8, on the first carrier, the first radio signal comprises L of the sub-radio signals respectively corresponding to sub-radio signal #1 to sub-radio signal # L. In the L sub-radio signals, there exist(s) L1 sub-radio signal(s), and L1 time interval(s) corresponding to the L1 sub-radio signal(s) (corresponding to sub-radio signal # i to sub-radio signal # (i+L1)) constitute(s) a target time interval set. On the second carrier, there is(are) R of the low latency radio signal(s) corresponding to the R time interval(s), and there exists at least a first time interval (corresponding to time intervals occupied by a sub-radio signal # Q1 and a low latency radio signal # Q2) in the R time interval(s), the first time interval belongs to the target time interval set. The L is a positive integer greater than 1, the i is an integer greater than or equal to 1, the (i+L1) is a integer less than or equal to L, the Q1 is an integer not less than i and not greater than (i+L1), the Q2 is an integer not less than 1 and not greater than R.

In one subembodiment, the L time intervals constitute 1 ms.

In one subembodiment, the L time intervals constitute a first sTTI, a given time interval of the R time interval(s) corresponds to a second sTTI, and duration time of the first sTTI is not shorter than that of the second sTTI. The given time interval is any time interval of the R time interval(s).

In one affiliated embodiment of the subembodiment, duration time of the sTTI in time domain is equal to that of T consecutive multi-carrier symbols. The T is equal to one of 2, 4 and 7.

In one subembodiment, the first radio signal belongs to a first carrier, and the low latency radio signal belongs to the second carrier, the first carrier and the second carrier are orthogonal in frequency domain.

Embodiment 9

Figure 9:
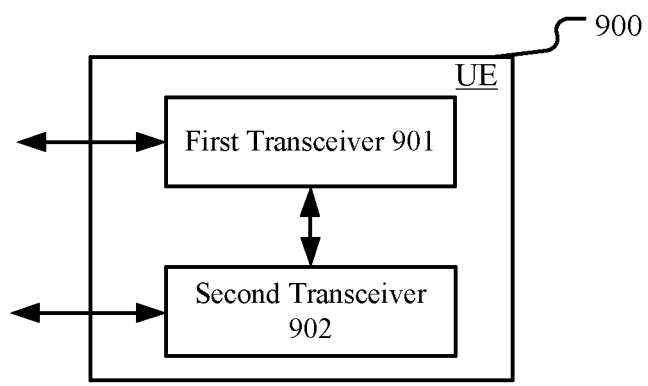
FIG. 9 is a structure block diagram illustrating a processing device in a UE according to one embodiment of the present disclosure.

Embodiment 9 illustrates a structure block diagram illustrating a processing device in a UE, as shown in FIG. 9. In FIG. 9, a UE processing device 900 comprises a first transceiver 901 and a second transceiver 902.

A first transceiver 901 determines a first power, and transmits a first radio signal with a first power on a first carrier;

A second transceiver 902 determines R power value(s), and transmits R low latency radio signal(s) with the R power value(s) on a second carrier;

In Embodiment 9, for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by R low latency radio signal(s) belong to R time interval(s) respectively, the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the first transceiver 901 further receives a first signaling, the first signaling is used for determining a first power control parameter, the first power control parameter comprises at least the former of the first ideal power and the first scaling factor.

In one subembodiment, the second transceiver 902 further receives a second signaling, the second signaling is used for determining a second power control parameter, the second power control parameter comprises at least the former two of the first reserved power, the second ideal power and the second scaling factor.

In one subembodiment, transmitting a given radio signal with a given power refers to: if the given power is greater than 0, transmitting the given radio signal, a transmitting power of the given radio signal is the given power; if the given power is equal to 0, dropping transmission of the given radio signal.

In one subembodiment, the first power is greater than 0, the phrase transmitting a first radio signal with a first power on a first carrier refers to: transmitting the first radio signal, a transmitting power of the first radio signal is the first power.

In one subembodiment, the first power is equal to 0, the phrase transmitting a first radio signal with a first power on a first carrier refers to: dropping transmission of a first radio signal.

In one subembodiment, the R power value(s) is(are) greater than 0, the phrase transmitting R low latency radio signal(s) with the R power value(s) respectively on a second carrier refers to: transmitting R low latency radio signal(s) with the R power value(s) respectively on a second carrier.

In one subembodiment, the R power value(s) is(are) equal to 0, the phrase transmitting R low latency radio signal(s) with the R power value(s) respectively on a second carrier refers to: dropping transmission of R low latency radio signal(s) on a second carrier.

In one subembodiment, R1 of the R power value(s) is(are) greater than 0, R2 of the R power value(s) is(are) equal to 0, the phrase transmitting R low latency radio signal(s) with the R power value(s) respectively on a second carrier refers to: dropping transmission of R2 low latency radio signal(s) on a second carrier, transmitting R1 low latency radio signal(s) on a second carrier, transmitting power(s) of the R1 low latency radio signal(s) is(are) the R1 power(s) respectively, the R is a sum of the R1 and the R2, the R1 low latency radio signal(s) and the R2 low latency radio signal(s) constitute the R low latency radio signals. The R1 and the R2 are positive integers less than the R, respectively.

In one subembodiment, the first transceiver 901 comprises a transmitter 456, a receiver 456, a transmitting processor 455, a receiving processor 452 and a power control processor 441 in FIG. 2.

In one subembodiment, the first transceiver 901 comprises a controller/processor 490 in FIG. 2.

In one subembodiment, the second transceiver 902 comprises a transmitter 456, a receiver 456, a transmitting processor 455, a receiving processor 452 and a power control processor 441 in FIG. 2.

In one subembodiment, the second transceiver 902 comprises a controller/processor 490 in FIG. 2.

Embodiment 10

Figure 10:
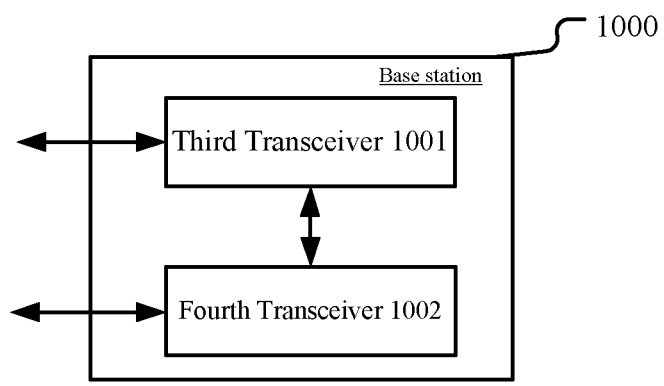
FIG. 10 is a structure block diagram illustrating a processing device in a base station according to one embodiment of the present disclosure.

Embodiment 10 illustrates a structure block diagram illustrating a processing device in a base station, as shown in FIG. 10. In FIG. 10, a base station processing device 1000 comprises a third transceiver 1001 and a fourth transceiver 1002.

A third transceiver 1001 detects a first radio signal on a first carrier;

A fourth transceiver 1002 detects R low latency radio signal(s) on a second carrier;

In Embodiment 10, a transmitting power of the first radio signal is a first power, transmitting power(s) of the R low latency radio signal(s) correspond(s) to R power value(s); for any given power of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries at least one of a first bit block and first UCI; the first radio signal comprises L sub-radio signals, the L sub-radio signals occupy L time intervals respectively, the L is a positive integer greater than 1; time domain resources occupied by the R low latency radio signal(s) belong to R time interval(s), the R time interval(s) is(are) R of the L time intervals, the R is a positive integer; the low latency radio signal carries at least one of a low latency bit block and low latency UCI; a target time interval set comprises L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

In one subembodiment, the third transceiver 1001 further transmits a first signaling, the first signaling is used for determining a first power control parameter, the first power control parameter comprises at least the former of the first ideal power and the first scaling factor.

In one subembodiment, the fourth transceiver 1002 further transmits a second signaling, the second signaling is used for determining a second power control parameter, the second power control parameter comprises at least the former two of the first reserved power, the second ideal power and the second scaling factor.

In one subembodiment, the third transceiver 1001 comprises a transmitter 416, a receiver 416, a transmitting processor 415, a receiving processor 412 and a power control processor 471 in FIG. 2.

In one subembodiment, the third transceiver 1001 comprises a controller/processor 440 in FIG. 2.

In one subembodiment, the fourth transceiver 1002 comprises a transmitter 416, a receiver 416, a transmitting processor 415, a receiving processor 412 and a power control processor 471 in FIG. 2.

In one subembodiment, the fourth transceiver 1002 comprises a controller/processor 440 in FIG. 2.

The ordinary skill in the art may understand that all or part steps in the above method may be implemented by instructing related hardware through a program. The program may be stored in a computer-readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to mobile phones, tablet computers, notebooks, vehicular communication device, wireless sensor, network cards, Internet of Things (IOT) terminals, RFID terminals, narrowband Internet of Things (NB-IOT) terminals, Machine Type Communication (MTC) terminals, eMTC terminals, and other wireless communication devices. The base station or system equipment in the present disclosure includes but is not limited to macro-cellular base stations, micro-cellular base stations, home base stations, relay base stations, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for low latency communication, comprising:
   determining a first power and transmitting a first radio signal with a first power on a first carrier; and
   determining R power value(s) and transmitting R low latency radio signal(s) with R power value(s) respectively on a second carrier;
   wherein for any given power of the R power value(s), if a given ideal power is lower than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries either a first bit block or first uplink control information or both of them; the first radio signal comprises L sub-radio signals, and the L sub-radio signals occupy L time intervals respectively, L is a positive integer greater than 1; time domain resources occupied by the R low latency radio signal(s) belong to R time interval(s) respectively, the R time interval(s) is(are) R of the L time intervals, R is a positive integer; the low latency radio signal carries at least a low latency bit block or low latency uplink control information; target time interval set comprises L1 time interval(s), the L1 time interval(s) is(are) L1 of the L time intervals, L1 is a positive integer lower than or equal to L; at least a first time interval of the R time interval(s) belongs to the target time interval set; the R low latency radio signal(s) comprises(comprise) a first low latency radio signal, a transmitting power of the low latency radio signal is a second power, the first power is used for determining the second power or the second power is used for determining the first power; time domain resources occupied by the first low latency radio signal belong to a first time interval; or the R time interval(s) is(are) out of the target time interval set, the first power is used for determining the R power value(s); the first time interval is one of the R time interval(s).

2. The method according to claim 1, wherein at least a first time interval of the R time intervals belongs to the target time interval set; the first radio signal carries the first bit block between the first bit block and the first uplink control information, the first low latency radio signal carries the low latency uplink control information; or the first radio signal carries the first uplink control information, the first low latency radio signal carries the low latency uplink control information, the first uplink control information is transmitted on a physical layer data channel, the low latency uplink control information is transmitted on a physical layer control channel; a first ideal power is less than or equal to a difference between a third power and a second power, the first power is equal to the first ideal power; or the first ideal power is greater than a difference between a third power and a second power, the first power is less than or equal to a difference between a third power and a second power; a second power is less than or equal to a third power, the second power is equal to the second ideal power; or a second ideal power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmission power and a fourth power, the fourth power is a total transmitting power of the UE on carriers other than the first carrier and the second carrier in the first time interval;

or, at least a first time interval of the R time interval(s) belongs to the target time interval set; the first radio signal carries the first uplink control information, the first low latency radio signal carries the low latency bit block between the low latency bit block and the low latency uplink control information; or the first radio signal carries the first uplink control information, the first low latency radio signal carries the low latency uplink control information, the first uplink control information is transmitted on a physical layer control channel, the low latency uplink control information is transmitted on a physical layer data channel; a second power is less than or equal to a difference between a third power and a first power, the second power is equal to a second ideal power; or a second ideal power is greater than a difference between a third power and a first power, the second power is less than or equal to a difference between a third power and a first power; a first power is less than or equal to a difference between a third power and a first reserved power, the first power is equal to the first ideal power; or a first ideal power is greater than a difference between a third power and a first reserved power, the first power is less than or equal to a difference between a third power and a first reserved power; or the first ideal power is a transmitting power of the first radio signal without power scaling, the second ideal power is a transmitting power of the first low latency radio signal without power scaling, the third power is a difference between a maximum total transmitting power and a fourth power, the fourth power is a total transmitting power of the UE on carriers other than the first carrier and the second carrier in the first time interval;

or;

at least a first time interval of the R time interval(s) belongs to the target time interval set; the first radio signal carries the first bit block between the first bit block and the first uplink control information, the first low latency radio signal carries the low latency bit block between the low latency bit block and the low latency uplink control information; or the first radio signal carries the first uplink control information, the first low latency radio signal carries the low latency uplink control information, the first uplink control information is transmitted on a physical layer control channel, the low latency uplink control information is transmitted on a physical layer control channel; or the first radio signal carries a first uplink control information, the first low latency radio signal carries the low latency uplink control information, the first uplink control information is transmitted on a physical layer data channel, the low latency uplink control information is transmitted on a physical layer data channel; a sum of a first ideal power and a second ideal power is less than or equal to a third power, the first power is equal to a first ideal power, the second power is equal to a second ideal power; or a sum of a first ideal power and a second ideal is greater than a third power and a second ideal power is less than or equal to a first reserved power, the second power is equal to a second ideal power, the first power is less than or equal to a difference between the third power and a second ideal power; or a sum of a first ideal power and a second ideal power is greater than a third power and a second ideal power is greater than a first reserved power, the first power is less than or equal to a product of a fifth power and a first scaling factor, a difference between the second power and a first reserved power is equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are real numbers not less than 0 and not greater than 1; the third power value is a difference between a maximum total transmitting power and a fourth power, the fourth power is a total transmitting power of the UE on carriers other than the first carrier and the second carrier in the first time interval, the fifth power is equal to a difference between the third power and a first reserved power;

or, the R time interval(s) is(are) out of the target time interval set; a first ideal power is less than or equal to a fifth power, the first power is equal to the first ideal power; or a first ideal power is greater than a fifth power, the first power is equal to a product of a fifth power and a first scaling factor; for any given low latency radio signal of the R low latency radio signal(s), a corresponding transmitting power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time intervals, the fifth power is equal to a difference between the third power and a first reserved power.

3. The method according to claim 2, wherein time domain resources occupied by R3 low latency radio signal(s) of the R low latency radio signal(s) belong to the target time interval set, R3 is a positive integer; the R3 low latency radio signal(s) comprises(comprise) V1 low latency radio signal(s), V2 low latency radio signal(s) and V3 low latency radio signal(s); V1, V2 and V3 are non-negative integers; a sum of V1, V2 and V3 is equal to R3; the V1 low latency radio signal(s) is(are) transmitted by physical layer control channel(s) respectively, the V2 low latency radio signal(s) is(are) transmitted by physical layer data channel(s) respectively, comprising the low latency uplink control information, the V3 low latency radio signal(s) is(are) transmitted by physical layer data channel(s), not comprising the low latency uplink control information; V1 is greater than 0, the first low latency radio signal is a radio signal with a greatest transmitting power of the V1 low latency radio signal(s) without power scaling; or V1 is equal to 0 and V2 is greater than 0, the first low latency radio signal is a radio signal with a greatest transmitting power in the V2 low latency radio signal(s) without power scaling; or both V1 and V2 are equal to 0, the first low latency radio signal is a low latency radio signal with a greatest power in the V3 low latency radio signal(s) without power scaling.

4. The method according to claim 2, comprising:
receiving a first signaling, the first signaling is used for determining a first power control parameter, the first power control parameter comprises at least the former of the first ideal power and the first scaling factor;
or receiving a second signaling, the second signaling is used for determining a second power control parameter, the second power control parameter comprises at least the former two of the first reserved power, the second ideal power and the second scaling factor;
or receiving a first signaling and receiving a second signaling, the first signaling is used for determining a first power control parameter, the first power control parameter comprises at least the former of the first ideal power and the first scaling factor, and the second signaling is used for determining a second power control parameter, the second power control parameter comprises at least the former two of the first reserved power, the second ideal power and the second scaling factor.

5. A User Equipment (UE) that supports low latency communication, comprising:
a first transceiver, determining a first power, and transmitting a first radio signal with a first power on a first carrier;
a second transceiver, determining R power value(s), and transmitting R low latency radio signal(s) with the R power value(s) respectively on a second carrier;
wherein for any given power value of the R power value(s), if a given ideal power is less than or equal to a first reserved power, the given power is equal to the given ideal power; if the given ideal power is greater than a first reserved power, the given power is greater than or equal to the first reserved power; the given ideal power is a transmitting power of a given low latency radio signal without power scaling, the given low latency radio signal is a low latency radio signal corresponding to the given power in the R low latency radio signal(s); the first radio signal carries either a first bit block or first uplink control information or both; the first radio signal comprises L sub-radio signals, the L sub-radio signals occupy L time intervals respectively, L is a positive integer greater than 1; time domain resources occupied by the R low latency radio signal(s) belong to R time interval(s) respectively, the R time interval(s) is(are) R of the L time intervals, R is a positive integer; the low latency radio signal carries either a low latency bit block or low latency uplink control information or both; a target time interval set comprises L1 time interval(s), the L 1 time interval(s) is(are) L1 of the L time intervals, L1 is a positive integer less than or equal to L; at least a first time interval of the R time interval(s) belongs to the target time interval set, the R low latency radio signal(s) comprises(comprise) a first low latency radio signal, a transmitting power of the first low latency radio signal is a second power, the first power is used for determining the second power or the second power is used for determining the first power, time domain resources occupied by the first low latency radio signal belong to a first time interval; or the R time interval(s) is(are) out of the target time interval set, the first power is used for determining the R power value(s); the first time interval is one of the R time interval(s).

6. The UE according to claim 5, wherein at least a first time interval of the R time interval(s) belongs to the target time interval set; the first radio signal carries the first bit block between the first bit block and the first uplink control information, the first low latency radio signal carries the low latency uplink control information; or the first radio signal carries the first uplink control information, the first low latency radio signal carries the low latency uplink control information, the first uplink control information is transmitted on a physical layer data channel, the low latency uplink control information is transmitted on a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; a second ideal power is less than or equal to a third power, the second power is equal to the second ideal power; or a second ideal power is greater than a third power, the second power is equal to a third power; the second ideal power is a transmitting power of the first low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval.

7. The UE according to claim 6, wherein time domain resources occupied by the R3 low latency radio signal(s) of the R low latency radio signal(s) belong to the target time interval set, R3 is a positive integer; the R3 low latency radio signal(s) comprises(comprise) V1 low latency radio signal(s), V2 low latency radio signal(s) and V3 low latency radio signal(s); the V1, V2 and V3 are non-negative integers; a sum of V1, V2 and V3 is equal to R3; the V1 low latency radio signal(s) is(are) transmitted on a physical layer control channel respectively, the V2 low latency radio signal(s) is(are) transmitted on a physical layer data channel, comprising the low latency uplink control information, the V3 low latency radio signal(s) is(are) transmitted on a physical layer data channel, not comprising the low latency uplink control information; V1 is greater than 0, the first low latency radio signal is a low latency radio signal with a greatest transmitting power in the V1 low latency radio signal(s) without power scaling; or V1 is equal to 0 and V2 is greater than 0, the first low latency radio signal is a low latency radio signal with a greatest transmitting power in the V2 low latency radio signal(s) without power scaling; or both V1 and V2 are equal to 0, the first low latency radio signal is a low latency radio signal with a greatest transmitting power in the V3 low latency radio signal(s) without power scaling.

8. The UE according to claim 6, wherein the first transceiver further receives a first signaling, the first radio signaling is used for determining a first power control parameter, the first power control parameter comprises at least the former of the first ideal power and the first scaling factor.

9. The UE according to claim 6, wherein the second transceiver further receives a second signaling, the second signaling is used for determining a second power control parameter, the second power control parameter comprises at least the former two of the first reserved power, the second ideal power and the second scaling factor.

10. The UE according to claim 5, wherein at least a first time interval of the R time intervals belongs to the target time interval set; the first radio signal carries the first uplink control information, the first low latency radio signal carries the low latency bit block between the low latency bit block and the low latency uplink control information; or the first radio signal carries the first uplink control information, the first low latency radio signal carries the low latency uplink control information, the first uplink control information is transmitted on a physical layer control channel, the low latency uplink control information is transmitted on a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; a first ideal power is less than or equal to a difference between a third power and a first reserved power, the first power is equal to the first ideal power; or a first ideal power is greater than a difference between a third power and a first reserved power, the first power is less than or equal to a difference between a third power and a first reserved power; the first ideal power is a transmitting power of the first radio signal without power scaling, the second ideal power is a transmitting power of the first low latency radio signal without power scaling, the third power is a difference between a maximum total transmitting power and a fourth power, the fourth power is a total transmitting power of the UE on carriers other than the first carrier and the second carrier in the first time interval.

11. The UE according to claim 5, wherein at least a first time interval of the R time interval(s) belongs to the target time interval set; the first radio signal carries the first bit block between the first bit block and the first uplink control information, the first low latency radio signal carries the low latency bit block between the low latency bit block and the low latency uplink control information; or the first radio signal carries the first uplink control information, the first low latency radio signal carries the low latency uplink control information, the first uplink control information is transmitted on a physical layer control channel, the low latency uplink control information is transmitted on a physical layer control layer; or the first radio signal carries the first uplink control information, the first low latency radio signal carries the low latency uplink control information, the first uplink control information is transmitted on a physical layer data channel, the low latency uplink control information is transmitted on a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power and a second ideal power is less than or equal to a first reserved power, the second power is equal to a second ideal power, the first power is less than or equal to a difference between a third power and a second ideal power; or a sum of a first ideal power and a second ideal power is greater than a third power and a second ideal power is greater than a first reserved power, the first power is less than or equal to a product of a fifth power and a first scaling factor, a difference between the second power and a first reserved power is equal to a product of a fifth power and a second scaling factor; the first ideal power is a transmitting power of the first radio signal without power scaling, the second ideal power is a transmitting power of the first low latency radio signal without power scaling; the first scaling factor and the second scaling factor are real numbers not less than 0 and not greater than 1; the third power is a difference between a maximum total transmitting power and a fourth power, the fourth power is a total transmitting power of the UE on carriers other than the first carrier and the second carrier in the first time interval, the fifth power is equal to a difference between the third power and a first reserved power.

12. The UE according to claim 5, wherein the R time interval(s) is(are) out of the target time interval set; a first ideal power is less than or equal to a fifth power, the first power is equal to the first ideal power; or a first ideal power is greater than a fifth power, the first power is equal to a product of a fifth power and a first scaling factor; for any given low latency radio signal of the R low latency radio signal(s), a corresponding power is a given power; if a given ideal power is less than or equal to a difference between a third power and the first power, the given power is equal to the given ideal power; if a given ideal power is greater than a difference between a third power and the first power, a difference between the given power and a first reserved power is equal to a product of a fifth power and a second scaling factor; the given ideal power is a transmitting power of the given low latency radio signal without power scaling, the first ideal power is a transmitting power of the first radio signal without power scaling, the third power is a difference between a maximum total transmitting power and a fourth power, the fourth power is a total transmitting power of the UE on carriers other than the first carrier and the second carrier in the first time interval, the fifth power is equal to a difference between the third power and a first reserved power.

* * * * *